(12) United States Patent
Ma et al.

(10) Patent No.: US 7,984,303 B1
(45) Date of Patent: *Jul. 19, 2011

(54) FLASH MEMORY DEVICES WITH SECURITY FEATURES

(75) Inventors: Abraham C. Ma, Fremont, CA (US); Frank I-Kang Yu, Palo Alto, CA (US); David Nguyen, San Jose, CA (US); Charles Lee, Cupertino, CA (US); Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 740 days.

This patent is subject to a terminal disclaimer.

(21) Appl. No.: 12/099,421

(22) Filed: Apr. 8, 2008

Related U.S. Application Data

(60) Continuation-in-part of application No. 12/025,706, filed on Feb. 4, 2008, and a continuation-in-part of application No. 11/864,671, filed on Sep. 28, 2007, now abandoned, and a continuation-in-part of application No. 11/685,143, filed on Mar. 12, 2007, which is a continuation-in-part of application No. 11/624,667, filed on Jan. 18, 2007, now abandoned, which is a continuation-in-part of application No. 11/377,235, filed on Mar. 15, 2006, now Pat. No. 7,631,195, and a continuation-in-part of application No. 10/789,333, filed on Feb. 26, 2004, now Pat. No. 7,318,117, application No. 12/099,421, which is a division of application No. 09/478,720, filed on Jan. 6, 2000, now Pat. No. 7,257,714.

(51) Int. Cl.
*H04L 9/00* (2006.01)
*H04L 9/32* (2006.01)
*G06F 7/04* (2006.01)

(52) U.S. Cl. ........ 713/186; 713/182; 713/183; 713/184; 713/185; 726/27; 726/28; 726/29; 726/30

(58) Field of Classification Search .................. 713/186
See application file for complete search history.

(56) References Cited

U.S. PATENT DOCUMENTS

| | | | |
|---|---|---|---|
| 5,623,552 A | 4/1997 | Lane | |
| 5,907,856 A | 5/1999 | Estakhri et al. | |
| 5,959,541 A | 9/1999 | DiMaria et al. | |
| 6,000,006 A | 12/1999 | Bruce et al. | |
| 6,012,636 A | 1/2000 | Smith | |
| 6,069,920 A | 5/2000 | Schulz et al. | |
| 6,081,858 A | 6/2000 | Abudayyeh et al. | |
| 6,125,192 A * | 9/2000 | Bjorn et al. | 382/124 |
| 6,193,152 B1 | 2/2001 | Fernando et al. | |
| 6,202,138 B1 | 3/2001 | Estakhri et al. | |

(Continued)

*Primary Examiner* — Longbit Chai
(74) *Attorney, Agent, or Firm* — Blakely Sokoloff Taylor & Zafman LLP

(57) ABSTRACT

In an electronic data storage device accessed by a host computer motherboard, a fingerprint sensor scans a fingerprint of a user of the electronic data storage device and generates fingerprint scan data. A processing unit activates an input/output interface circuit to store a data file and fingerprint reference data obtained by scanning a fingerprint of a person authorized to access the data file in a memory device having non-volatile memory, where the processing unit transmits the data file to the host computer motherboard upon verifying that the user of the electronic data storage device is authorized to access the data file stored in the memory device as a result of comparison between the fingerprint scan data from the fingerprint sensor and the fingerprint reference data. Other methods and apparatuses are also described.

26 Claims, 40 Drawing Sheets

U.S. PATENT DOCUMENTS

| | | |
|---|---|---|
| 6,230,233 B1 | 5/2001 | Lofgren et al. |
| 6,275,894 B1 | 8/2001 | Kuo et al. |
| 6,321,478 B1 | 11/2001 | Klebes |
| 6,547,130 B1 | 4/2003 | Shen |
| 6,636,929 B1 | 10/2003 | Frantz et al. |
| 6,718,407 B2 | 4/2004 | Martwick |
| 6,880,024 B2 | 4/2005 | Chen et al. |
| 7,103,765 B2 | 9/2006 | Chen |
| 7,249,978 B1 | 7/2007 | Ni |
| 7,257,714 B1 | 8/2007 | Shen |
| 7,690,030 B1 * | 3/2010 | Ma et al. .................. 726/9 |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2004/0148482 A1 | 7/2004 | Grundy et al. |
| 2004/0255054 A1 | 12/2004 | Pua et al. |
| 2005/0102444 A1 | 5/2005 | Cruz |
| 2005/0120146 A1 | 6/2005 | Chen et al. |
| 2005/0160213 A1 | 7/2005 | Chen |
| 2005/0193161 A1 | 9/2005 | Lee et al. |
| 2005/0246243 A1 | 11/2005 | Adams et al. |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2007/0094489 A1 | 4/2007 | Ota et al. |
| 2007/0112067 A1 | 5/2007 | Oh et al. |
| 2007/0113267 A1 | 5/2007 | Iwanski et al. |
| 2007/0130436 A1 | 6/2007 | Shen |

* cited by examiner

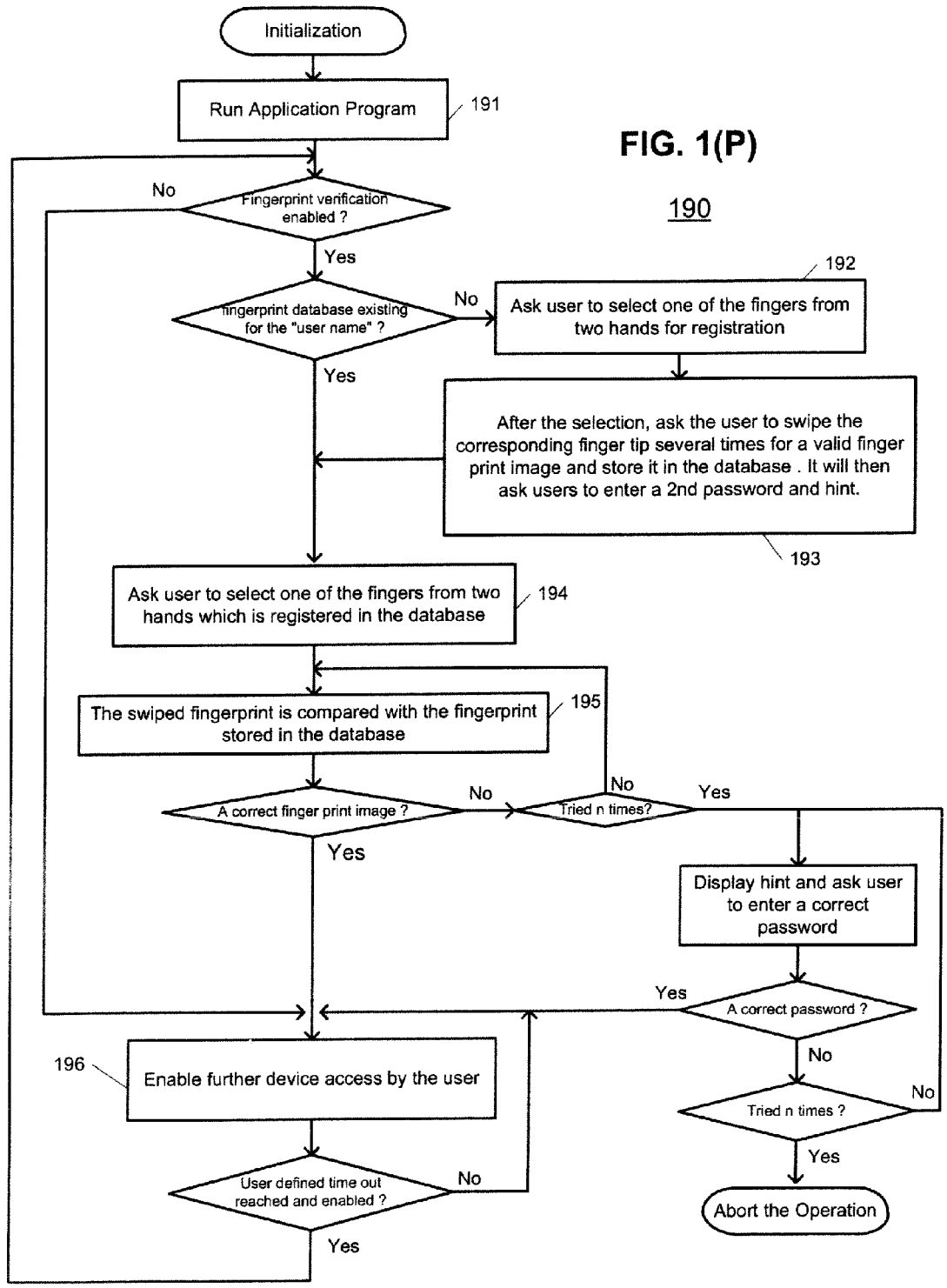

Data structure of PLTPPUI in Reserved Area of MLC Flash Memory 420

Old physical block (PBK#1000) for storing PLTPPUI0 422

| | 427 | | 442 | 446 |
|---|---|---|---|---|
| 1st Write (P0) 424a | Entry 0 | Entry 1 | •• | FF | Special Logical Address for PLTPPUI0 | 1 |
| 2nd Write (P1) 424b | Entry 0 | Entry 1 | | | |
| •• | | | | | |
| nth Write (Pn) 424n | Entry 0 | Entry 1 | •• | | |

{ 425  } 426

New physical block (PBK#1012) for storing PLTPPUI0 432

| (n+1)th Write (P0) 434 | Entry 0 | Entry 1 | •• | FF | Special Logical Address for PLTPPUI0 | 2 |
|---|---|---|---|---|---|---|
| | | | | | | |
| | | | | | | |
| | | | | | | |

*FIG. 4C*

Data Structure of the PLTPPUI Tracking Table 440

| | Physical Block Number 444 | Tracking No. (TN) 446 | Highest Page 448 |
|---|---|---|---|
| Special Logical Address for PLTPPUI0 | 1012 | 0 | 0 |
| Special Logical Address for PLTPPUI1 | 1018 | 5 | 1 |
| ... | | | |
| Special Logical Address for PLTPPUIN | 1005 | 4 | 0 |

Data Structure of the WL/BB Tracking Table 450

| | Physical Block Number 454 | Tracking No. (TN) 456 | Highest Page 458 |
|---|---|---|---|
| Special Logical Address for WL/BB0 | 1023 | 1 | 5 |
| Special Logical Address for WL/BB1 | 1020 | 0 | 3 |
| ⋮ | | | |
| Special Logical Address for WL/BBn | 1021 | 3 | 7 |

Data Structure of the WL/BB Tracking Table in Reserved Area of Flash Memory 460

| | | | | | | 467 452 456 | |
|---|---|---|---|---|---|---|---|
| 1st Write (P0) | BK0 (Reserved) | BK1 WL | | | | BK7 BB FFFF FFEE | F F | Special Logical Address for WL/BB1 | 1 |
| 2nd Write (P1) | | BK1 WL old | BK3 WL new | | | | | | |
| 3rd Write (P2) | | BK1 WL old | BK3 WL old | BK5 WL new | | | | | |
| ⋮ | | | | | | | | | |
| nth Write (Pn) | | | | | BK1000 WL new | | | | |

| 1st Write (P0) | BK1000 WL new | | | BK1003 BB | | | F F | Special Logical Address for WL/BB2 | 1 |
|---|---|---|---|---|---|---|---|---|---|
| 2nd Write (P1) | BK1000 WL old | | BK1021 WL new | | | | | | |
| ⋮ | | | | | | | | | |
| nth Write (Pn) | | | | | | | | | |

*FIG. 4F*

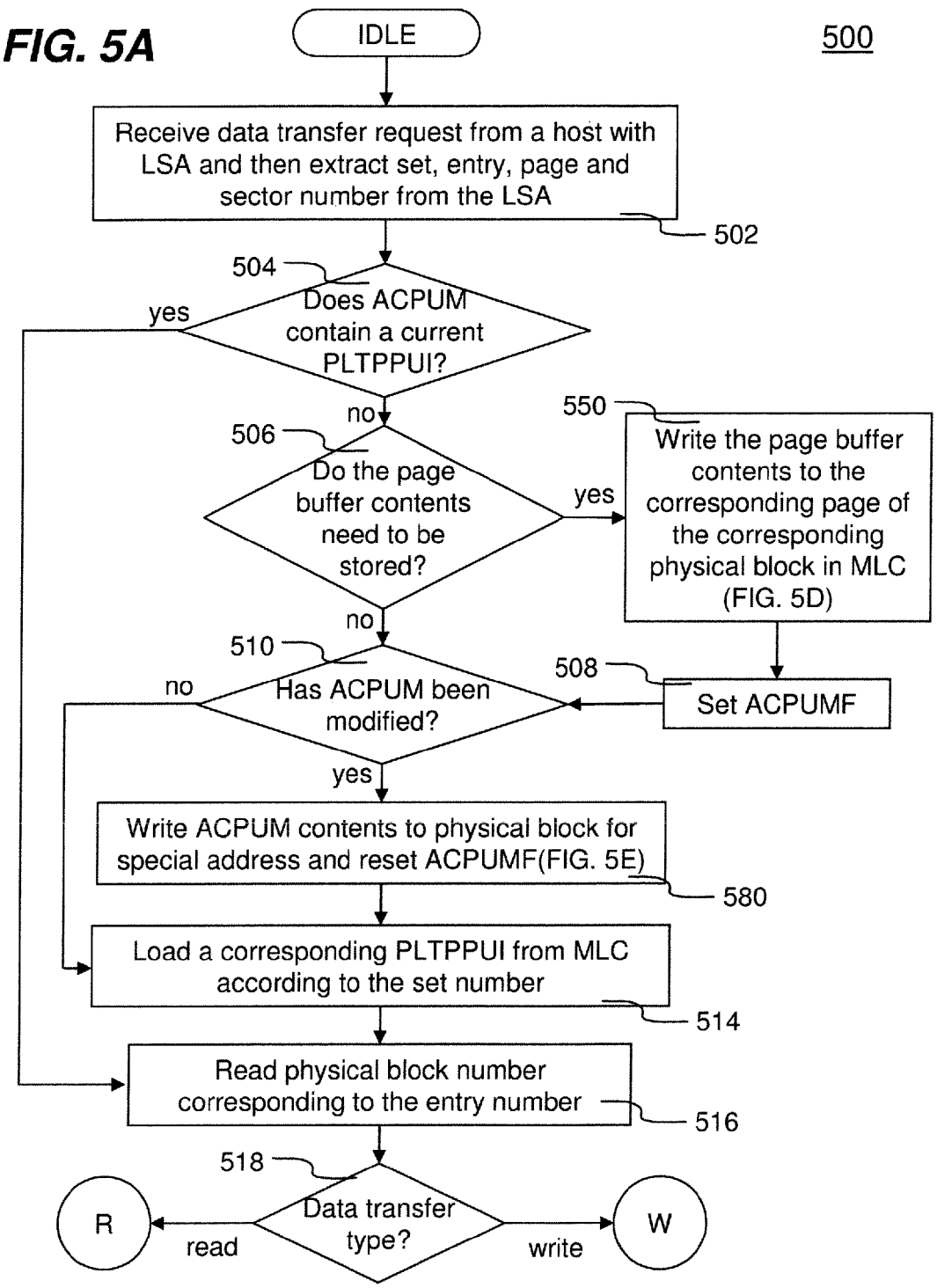

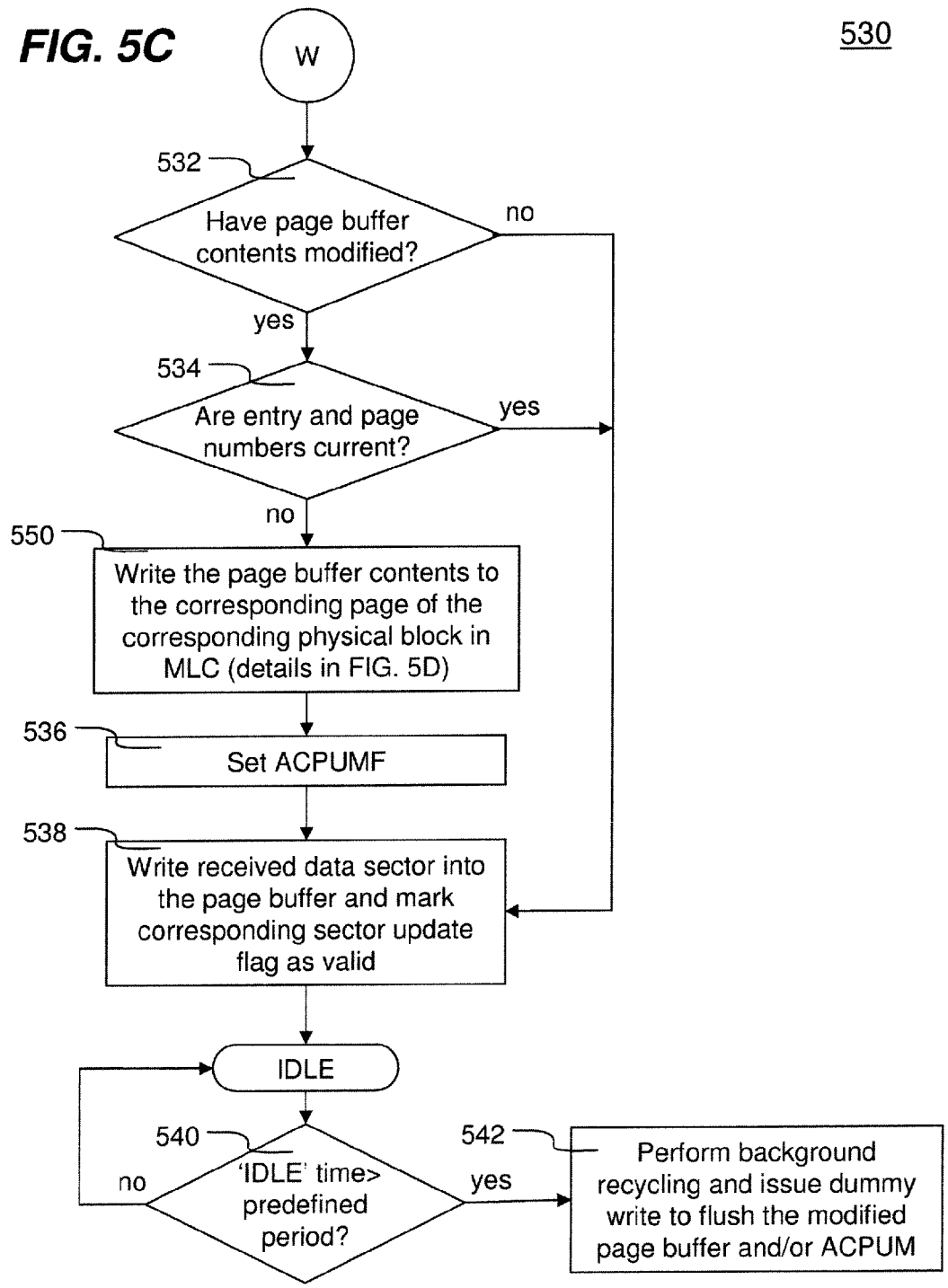

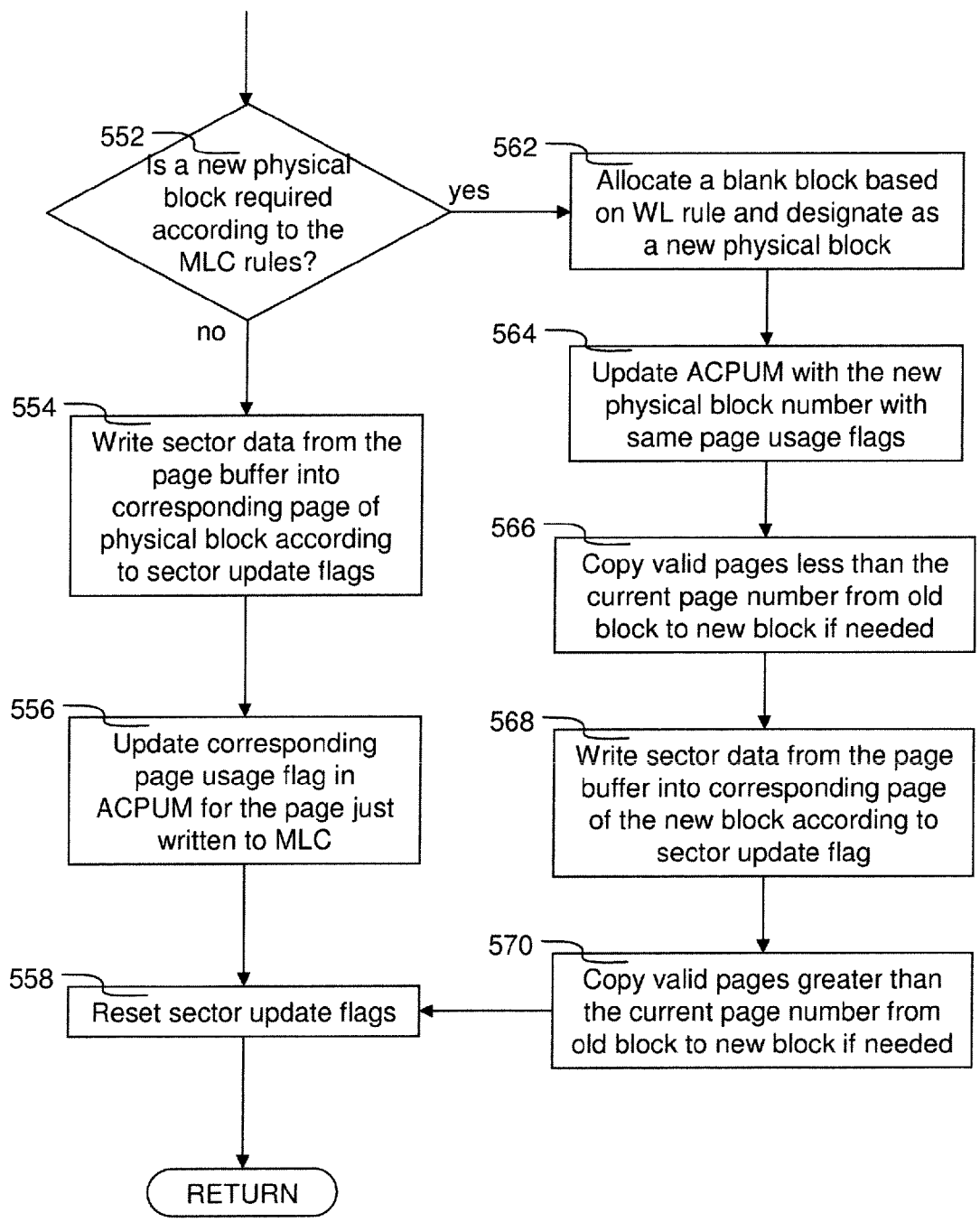

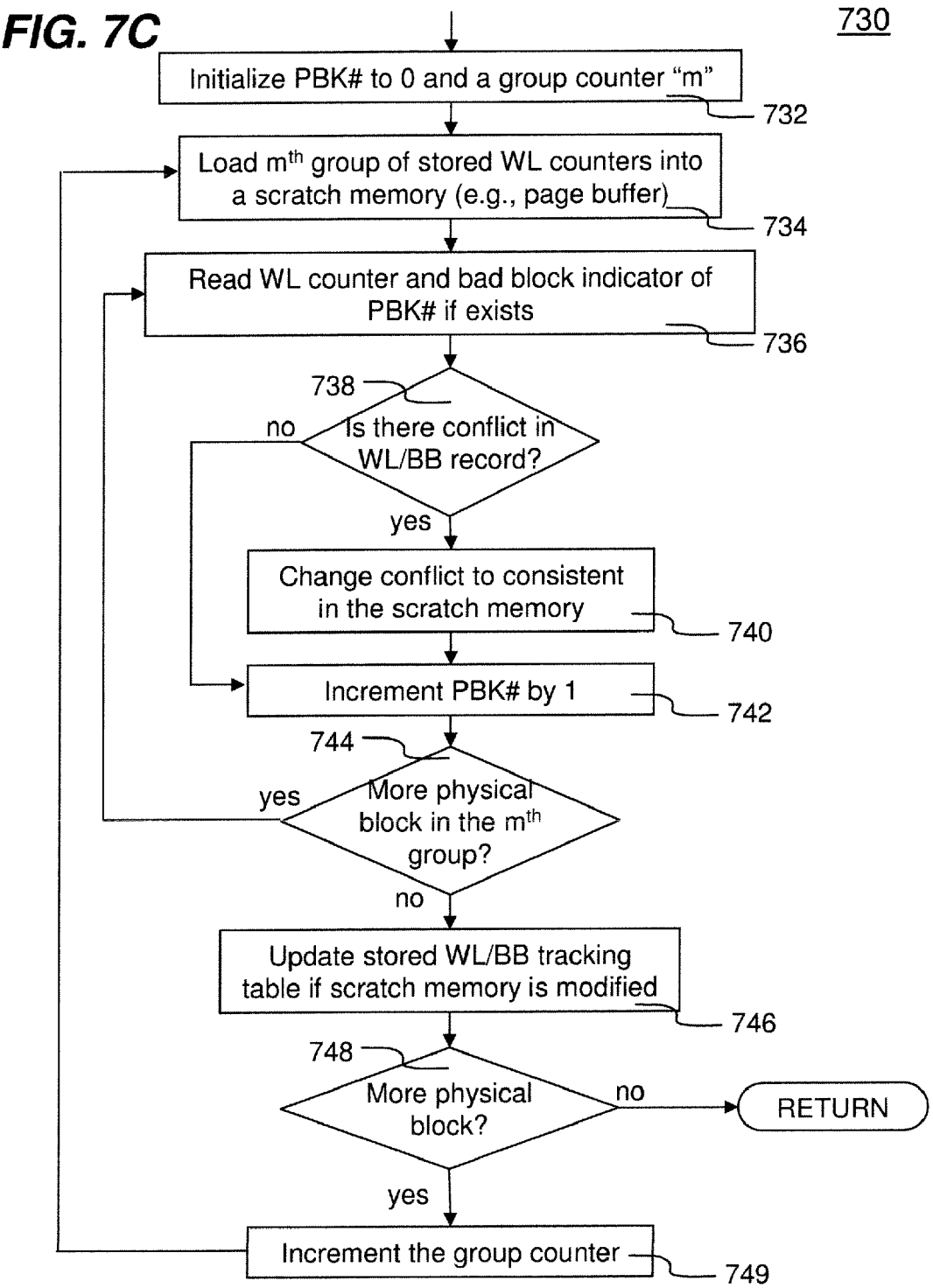

FLASH MEMORY DEVICES WITH SECURITY FEATURES

RELATED APPLICATIONS

This application is a continuation-in-part (CIP) of co-pending U.S. patent application Ser. No. 12/025,706, filed Feb. 4, 2008, entitled "Method and Systems of Managing Memory Addresses in a Large Capacity Multi-Level-Cell (MLC) Based Flash Memory Device."

This application is a CIP of U.S. patent application Ser. No. 11/864,671, entitled "Electronic Data Flash Card with Various Flash Memory Cells", filed Sep. 28, 2007, and U.S. patent application for "System and Method for Controlling Flash Memory", Ser. No. 10/789,333, filed Feb. 26, 2004.

This application is also a continuation in part (CIP) of co-pending U.S. patent application for "Data Security For Electronic Data Flash Card", Ser. No. 11/685,143, filed on Mar. 12, 2007, which is a CIP of U.S. patent application for "System and Method for Providing Security to a Portable Storage Device", Ser. No. 11/377,235, filed on Mar. 15, 2006.

This application is also a continuation in part (CIP) of co-pending U.S. patent application for "Electronic Data Storage Medium with Fingerprint Verification Capability", Ser. No. 11/624,667, filed on Jan. 18, 2007, which is a divisional application of U.S. patent application Ser. No. 09/478,720, filed on Jan. 6, 2000, now U.S. Pat. No. 7,257,714 issued on Aug. 14, 2007, which has been petitioned to claim the benefit of CIP status of one of inventor's earlier U.S. patent application for "Integrated Circuit Card with Fingerprint Verification Capability", Ser. No. 09/366,976, filed on Aug. 4, 1999, now issued as U.S. Pat. No. 6,547,130. The disclosure of the above-identified patent applications and patents is incorporated by reference herein in its entirety.

FIELD OF THE INVENTION

The invention relates to electronic data flash cards, more particularly to a system and method for controlling flash memory in an electronic data flash card with various types of the flash memory cells.

BACKGROUND

Confidential data files are often stored in floppy disks or are delivered via networks that require passwords or that use encryption and decryption coding for security. Confidential documents are sent by adding safety seals and impressions during delivery. However, confidential data files and documents are exposed to the danger that the passwords, encryption and decryption codes, safety seals and impressions may be broken (deciphered), thereby resulting in unauthorized access to the confidential information.

As flash memory technology becomes more advanced, flash memory is replacing traditional magnetic disks as storage media for mobile systems. Flash memory has significant advantages over floppy disks or magnetic hard disks such as having high-G resistance and low power dissipation. Because of the smaller physical size of flash memory, they are also more conducive to mobile systems. Accordingly, the flash memory trend has been growing because of its compatibility with mobile systems and low-power feature. However, advances in flash technology have created a greater variety of flash memory device types that vary for reasons of performance, cost and capacity. As such, a problem arises when mobile systems that are designed for one type of flash memory are constructed using another, incompatible type of flash memory.

New generation personal computer (PC) card technologies have been developed that combine flash memory with architecture that is compatible with the Universal Serial Bus (USB) standard. This has further fueled the flash memory trend because the USB standard is easy to implement and is popular with PC users. In addition, flash memory is replacing floppy disks because flash memory provides higher storage capacity and faster access speeds than floppy drives.

However, the USB standard has several features that require additional processing resources. These features include fixed-frame times, transaction packets, and enumeration processes. For better optimization, these features have been implemented in application-specific integrated circuits (ASICs).

A problem with USB mass-storage devices is that they are slow. The USB interface is significantly slower than IDE (Integrated Drive Electronics) interface in particular. This is because of the overhead associated with the USB standard, which include additional resources required for managing USB commands and handshake packets. Bulk-only transactions introduced by the USB standard have relieved some resources but only if the USB traffic is not too busy.

In addition to the limitations introduced by the USB standard, there are inherent limitations with flash memory. First, flash memory sectors that have already been programmed must be erased before being reprogrammed. Also, flash memory sectors have a limited life span; i.e., they can be erased only a limited number of times before failure. Accordingly, flash memory access is slow due to the erase-before-write nature and ongoing erasing will damage the flash memory sectors over time.

To address the speed problems with USB-standard flash memory, hardware and firmware utilize existing small computer systems interface (SCSI) protocols so that flash memory can function as mass-storage devices similarly to magnetic hard disks. SCSI protocols have been used in USB-standard mass-storage devices long before flash memory devices have been widely adopted as storage media. Accordingly, the USB standard has incorporated traditional SCSI protocols to manage flash memory.

A problem with SCSI protocols is that they do not include an erase command to address the erase-before-write nature of flash memory. Accordingly, the erase operation is handled by the host system, which further ties up the host system resources.

Some solutions have been introduced that involve new USB packet definitions such as write flash, read flash, and erase flash definitions. However, these definitions are not an efficient way to handle flash memory because they introduce additional protocols that require additional computing resources at the host system. They also do not address the sector-wear issues.

Another solution provides a driver procedure for flash memory write transactions. This procedure has three different sub-procedures. Generally, the data of a requested flash memory address is first read. If there is data already written to that address, the firmware executes an erase command. Then, if the erase command executes correctly, the firmware executes a write request. However, this driver procedure utilizes protocols that require additional computing resources at the host system.

Another solution provides a flash sector format that has two fields: a data field and a spare field. The spare field contains control data that include flags that facilitate in the management of the sectors. However the flags introduce ASIC complexity when the host system writes to the sectors.

Disadvantages of many of the above-described and other known arrangements include additional host system resources required to process special protocols and the resulting added processing time required for managing flash memory.

SUMMARY OF THE DESCRIPTION

In an electronic data storage device accessed by a host system, a fingerprint sensor scans a fingerprint of a user of the electronic data storage device and generates fingerprint scan data. A processing unit initially stores the fingerprint scan data of an authorized user as fingerprint reference data in a memory device having non-volatile memory such as Single-Level-Cell or Multi-Level-Cell flash memory. Subsequently the processing unit activates an input/output interface circuit to store a data file from host to the memory device or to transmit a data file stored in the memory device to the host only upon verifying that the user of the electronic data storage device is the authorized user as a result of comparison between the user's fingerprint scan data obtained from the fingerprint sensor and the stored fingerprint reference data.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 1(M)-1(P) are flow diagrams illustrating various security processes using fingerprint features of USB flash memory devices according to other embodiments of the invention.

FIGS. 4(A)-4(F) collectively show examples of data structures used for managing memory addresses of the flash memory of FIG. 2(A) in accordance with one embodiment of the invention.

FIGS. 5(A)-5(E) collectively show a flow chart of a process of conducting data transfer requests of the flash memory of FIG. 2A in accordance with one embodiment of the invention.

FIGS. 7(A)-7(E) collectively are flow diagrams illustrating a process of initialization of a large capacity flash memory device in accordance with one embodiment of the invention.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
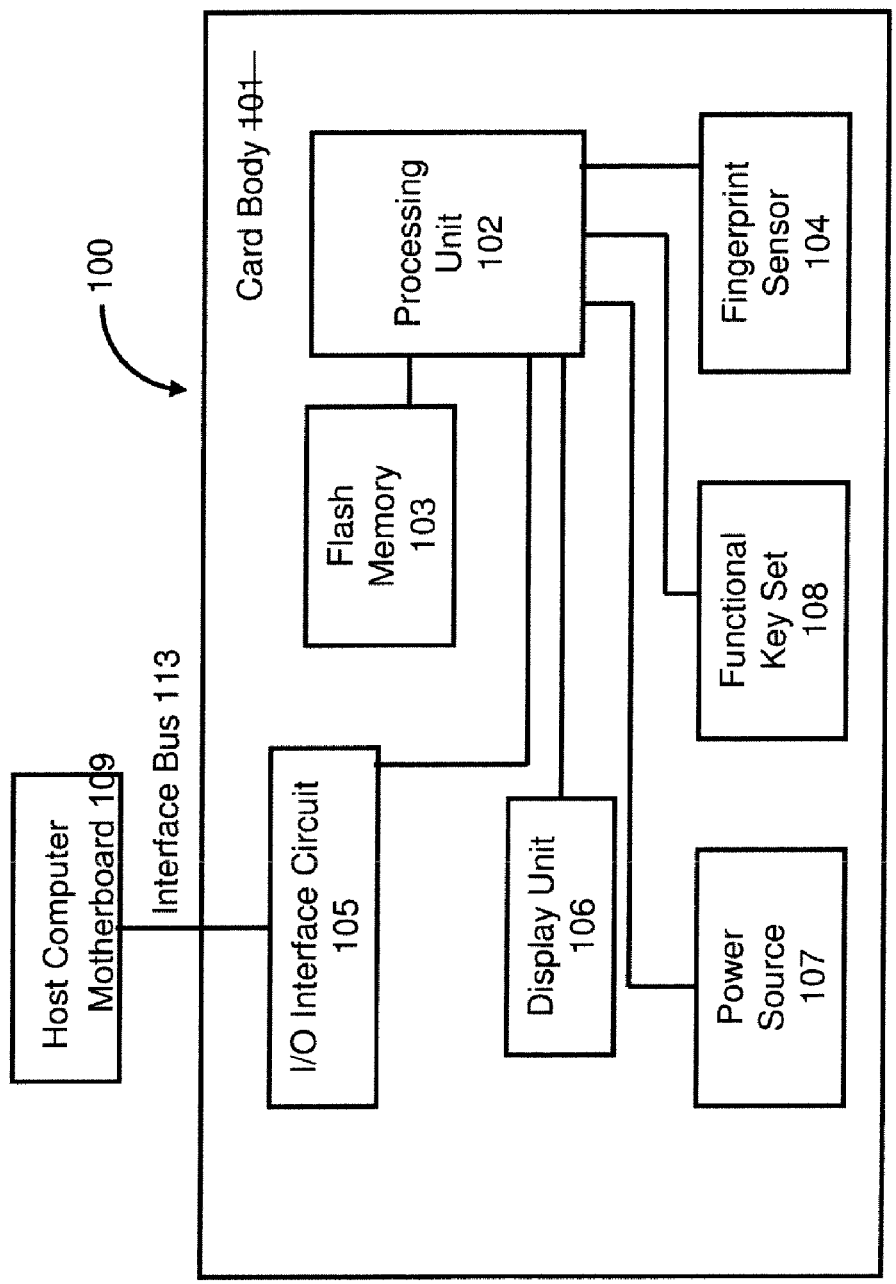
FIG. 1(A) is a block diagram showing a conventional memory storage device.

FIG. 1(A) is a block diagram illustrating a conventional memory storage device. Referring to FIG. 1(A), an electronic data flash card 100 is adapted to be accessed by a host Computer Motherboard 109 either via an Interface Bus 113, a card reader, or other interface mechanism (not shown), and includes a card body 101, a processing unit 102, one or more flash memory devices 103, a fingerprint sensor 104, an input/output interface circuit 105, an optional display unit 106, an optional power source (e.g., battery) 107, and an optional function key set 108.

Flash memory device 103 is mounted on the card body 101 which is a substrate for SMT (surface mount technology) manufacturing or a substrate for Chip On Board (COB) manufacturing, etc. Flash memory device 103 stores in a known manner therein one or more data files, a reference password, and fingerprint reference data obtained by scanning a fingerprint of one or more authorized users of the electronic data flash card 100. Only the authorized users can access the stored data files. The data file can be a picture file or a text file.

The fingerprint sensor 104 is mounted on the card body 101, and is adapted to scan a fingerprint of a user of electronic data flash card to generate fingerprint scan data. The input/output interface circuit 105 is mounted on the card body 101, and can be activated so as to establish communication with the host Computer Motherboard 109 by way of an appropriate socket via an interface bus or a card reader. In one embodiment, input/output interface circuit 105 includes circuits and control logic associated with a Universal Serial Bus (USB) interface structure that is connectable to an associated socket connected to or mounted on the host Computer Motherboard 109. The interface structure, for example, a Universal Serial Bus (USB) connector includes an input/output (I/O) interface circuit configured for establishing USB Bulk Only Transport (BOT) communications with a host computing device (host). There are four types of USB software communication data flow between the host and the I/O interface circuit of the flash memory device: control, interrupt, bulk, and isochronous. Control transfer is a data flow over the control pipe from the host to the flash memory device to provide configuration and control information. Interrupt transfer is a small-data, non-periodic, guaranteed-latency, device-initiated communication typically used for notifying the host that a service is needed by the flash memory device. Movement of large blocks of data across the I/O interface circuit that is not time critical relies on a bulk transfer. Isochronous transfer is used when working with isochronous data. Isochronous transfers provide periodic, continuous communication between the host and the flash memory device. There are two data transfer protocols generally supported by I/O interface circuits: Control/Bulk/Interrupt (CBI) protocol and Bulk-Only Transfer (BOT) protocol. The mass storage class CBI transport specification is approved for use with full-speed floppy disk drives, but is not used in high-speed capable devices, or in devices other than floppy disk drives (according to USB specifications). In accordance with an embodiment of the present invention, a flash memory device transfers high-speed data between the host and the flash memory device using only the BOT protocol, which is a more efficient and faster transfer protocol than CBI protocol because BOT transport of command, data, status rely on Bulk endpoints in addition to default Control endpoints. In another embodiment, the input/output interface circuit may include one of a Universal Serial Bus, Secure Digital interface circuit, Peripheral Component Interconnect Express, Radio Frequency identification, etc., which interfaces with the host computer via an interface bus or a card reader.

The processing unit 102 is mounted on the card body 101, and is coupled to the flash memory device 103, the fingerprint sensor 104 and the input/output interface circuit 105 by way of associated electrically conductive traces or wires disposed on card body 101. In one embodiment, processing unit 102 is one of an 8051, 8052, 80286 microprocessors available, for example, from Intel Corporation. In other embodiments, processing unit includes a RISC, ARM, MIPS or other digital signal processors (DSP). In accordance with an aspect of the present invention, processing unit 102 is controlled by a program stored at least partially in flash memory device 103 such that processing unit 102 is operable selectively in: (1) a programming mode, where the processing unit activates the input/output interface circuit 105 to receive the data file from the host Computer Motherboard 109 and/or the fingerprint reference data from fingerprint sensor 104 under the control of the host Computer Motherboard 109, and store the data file and the fingerprint reference data in flash memory device 103; (2) a data retrieving mode, where the processing unit 102 activates the input/output interface circuit 105 to transmit the data file stored in flash memory device 103 to the host Computer Motherboard 109; and (3) a data resetting mode, where the data file and the fingerprint reference data are erased from the flash memory device 103. In operations, host Computer Motherboard 109 sends write and read requests to electronic data flash card 100 vian Interface Bus 113 or a card reader and input/output interface circuit to the processing unit 102, which in turn utilizes a flash memory controller (not shown or embedded in the processing unit) to read from and/or write to the associated one or more flash memory devices 103. In one embodiment, for further security protection, the processing unit 102 automatically initiates operations in the data resetting mode upon detecting that a preset time period has elapsed since the last authorized access of the data file stored in the flash memory device 103.

The optional power source 107 is mounted on the card body 101, and is connected to the processing unit 102 and other associated units on card body 101 for supplying electrical power (to all card function) thereto. The optional function key set 108, which is mounted on the card body 101, is connected to the processing unit 102, and is operable so as to initiate operation of processing unit in a selected one of the programming, data retrieving and data resetting modes. The function key set 108 is operable to provide an input password to the processing unit 102. The processing unit 102 compares the input password with the reference password stored in the flash memory device 103, and initiates authorized operation of electronic data flash card 100 upon verifying that the input password corresponds with the reference password. The optional display unit 106 is mounted on the card body 101, and is connected to and controlled by the processing unit 102 for showing the data file exchanged with the host Computer Motherboard 109, the function key set keying information and for displaying the operating status of the electronic data flash card.

Figure 1B:
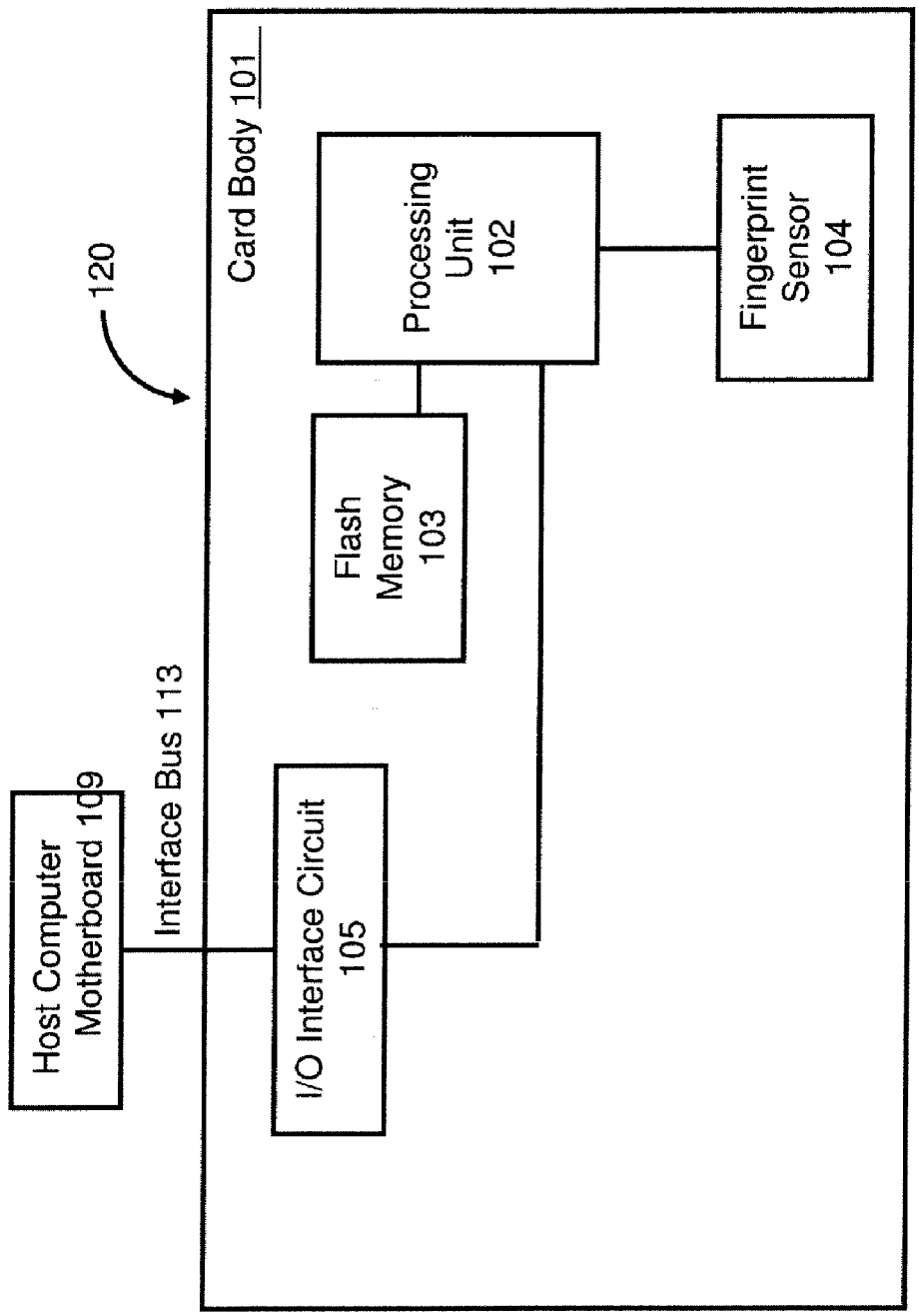
FIG. 1(B) is a block diagram illustrating an example of a memory storage device according to one embodiment of the invention.

FIG. 1(B) is a block diagram illustrating a memory storage system according to one embodiment of the invention. Referring to FIG. 1(B), similar to the system as shown in FIG. 1(A), device 120 includes an I/O interface circuit 105, memory device 103, processing unit 102, and fingerprint sensor 104, where the function key set and the display unit of system as shown in FIG. 1(A) are omitted. Instead, such functionalities may be implemented using the existing ones provided by host 109 via Interface Bus 113. Furthermore, in another embodiment, integrate Card Body 101 into Host Computer Motherboard 109 in applications such as Note Book Computers, Laptops, Cell Phones, GPSs, MP3/MP4 players, etc. . . . to provide the fingerprint protection to the owner.

Figure 1C:
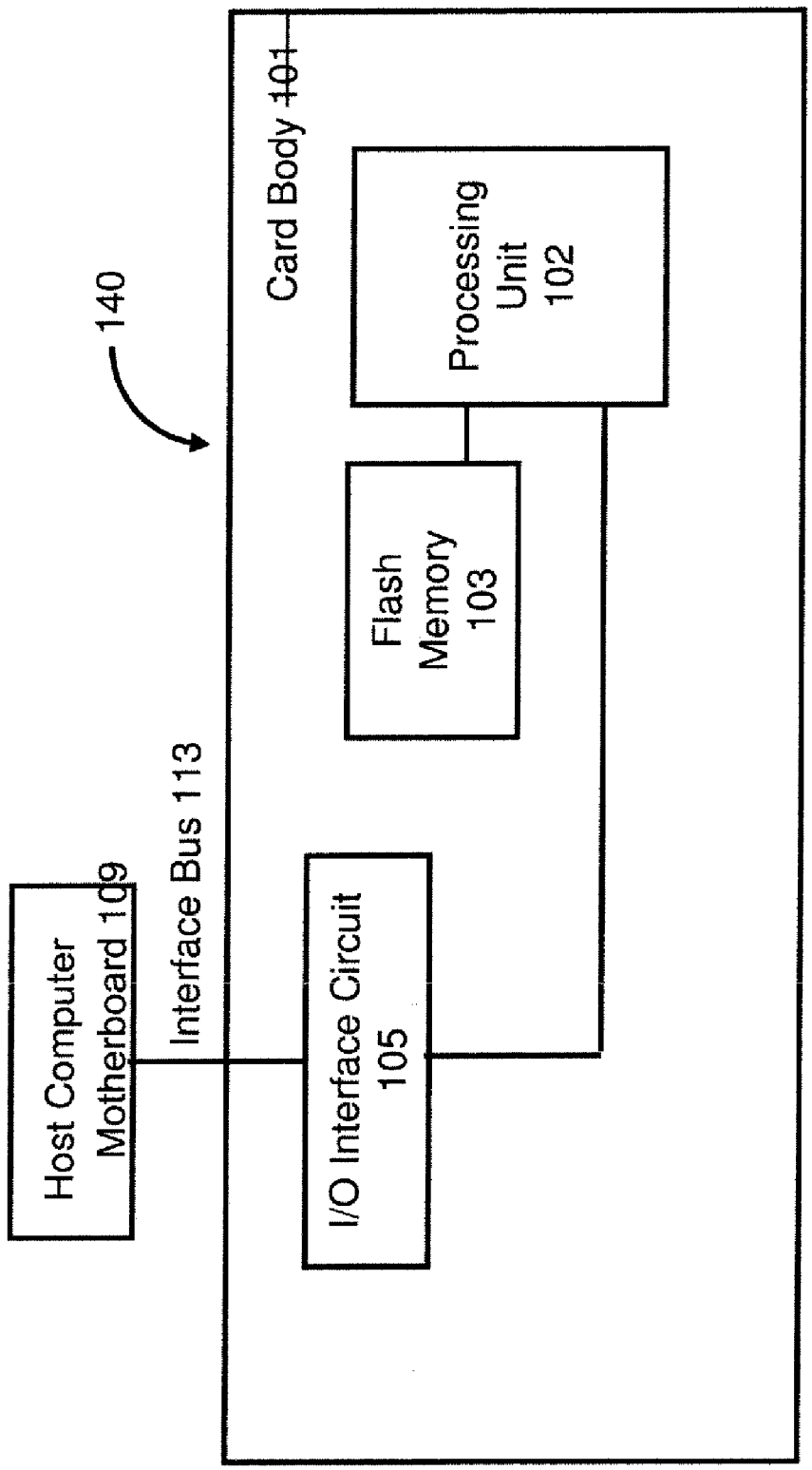
FIG. 1(C) is a block diagram illustrating another example of a memory storage device according to one embodiment of the invention.

FIG. 1(C) is a block diagram illustrating a memory storage system according to yet another embodiment of the invention. Referring to FIG. 1(C), similar to the system as shown in FIG. 1(B), a fingerprint sensor is omitted. Instead, the fingerprint sensor may be implemented using the host 109 such as notebook via Interface Bus 113.

Referring to FIGS. 1(B) and 1(C), an electronic data storage device is adapted to be accessed by a host Computer Motherboard 109 via an Interface Bus 113. The Interface Bus includes one of a Universal Serial Bus (USB), Radio Frequency Identification (RFID) interfaces etc. The electronic data storage device includes a substrate (not shown), a processing unit 102 mounted on the substrate, a memory device 103 mounted on the substrate, an optional fingerprint sensor 104 mounted on the substrate, and an input/output interface circuit 105 mounted on the substrate. The substrate may be implemented in a variety of form factors, such as, for example, a PCB (printed circuit board), a slim PCB assembly, or a COB package. In one embodiment, the memory device 103 is a flash memory, which may include a variety of flash memory configurations including, for example, MLC (multi-level cell) flash memory. The memory device 103 stores fingerprint reference data obtained by scanning a fingerprint of an assigned user. The fingerprint reference data includes multiple scan line data, each of which describes fingerprint characteristics in a respective scanning line of the fingerprint of the assigned user.

The fingerprint sensor 104 is adapted to scan a fingerprint of a user and to generate fingerprint scan data. One example of the fingerprint sensor 104 that can be used with one embodiment of the invention has been described in a co-owned U.S. Pat. No. 6,547,130, entitled "Integrated Circuit Card with Fingerprint Verification Capability", which is incorporated herein by reference herein. The fingerprint sensor described in the above patent includes an array of scan cells that defines a fingerprint scanning area. The fingerprint scan data includes multiple scan line data obtained by scanning corresponding lines of array of scan cells. The lines of array of scan cells are scanned in a row direction as well as column direction of the array. Each of the scan cells generates a first logic signal upon detection of a ridge in the fingerprint of the holder of card body, and a second logic signal upon detection of a valley in the fingerprint of the holder of card body.

Figure 1D:
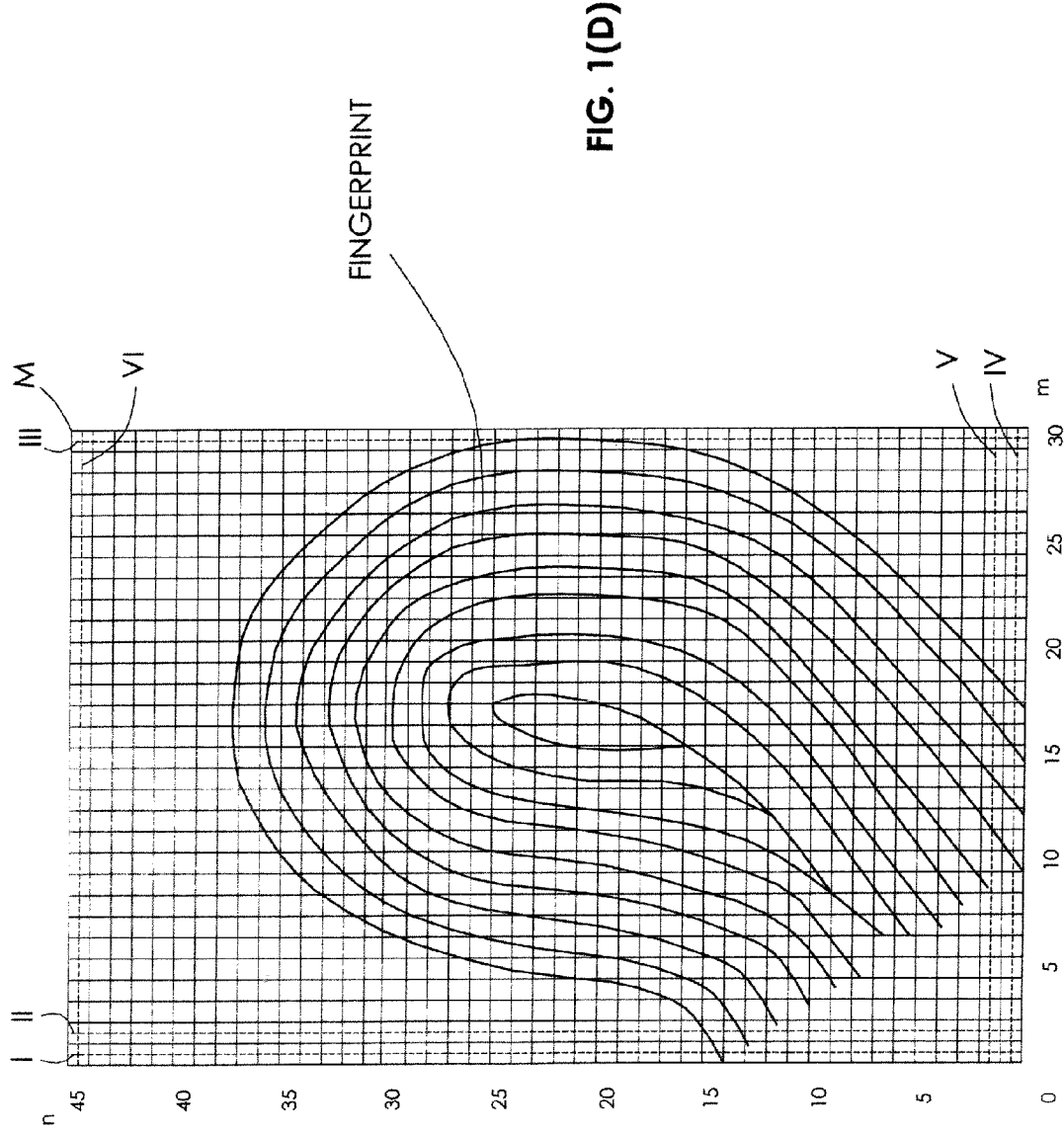
FIG. 1(D) is a scan line data diagram illustrating scanning lines of a fingerprint from an "Area" fingerprint sensor.

As shown in FIG. 1(D), the fingerprint sensor is adapted to scan a fingerprint of a holder of the card body and to generate fingerprint scan data. Referring to FIG. 1(D), the fingerprint sensor includes an m×n array of scan cells that defines a fingerprint scanning area (M) The fingerprint scan data includes a plurality of scan line data obtained by scanning corresponding lines of the array of scan cells. The holder of the card body needs to press and hold his/her finger to the surface of the fingerprint sensor. The lines of the array of scan cells can be scanned in a column direction or a row direction of the array. For example, if m=30, n=45, a first scanning line (I) in the column direction is (1' n; n=1.about.45), a second scanning line (II) in the column direction is (2' n; n=1.about.45), and a thirtieth scanning line (III), the last scanning line in the column direction, is (30' n; n=1.about.45). A first scanning line (IV) in the row direction is (m'1; m=1.about.30), a second scanning line (V) in the row direction is (m'2; m=1.about.30), and a forty-fifth scanning line, the last scanning line in the row direction, is (m'45; m=1.about.30). Each of the scan cells generates a high logic signal upon detection of a ridge in the fingerprint of the holder of the card body, and a low logic signal upon detection of a valley in the fingerprint of the holder of the card body.

Figure 1E:
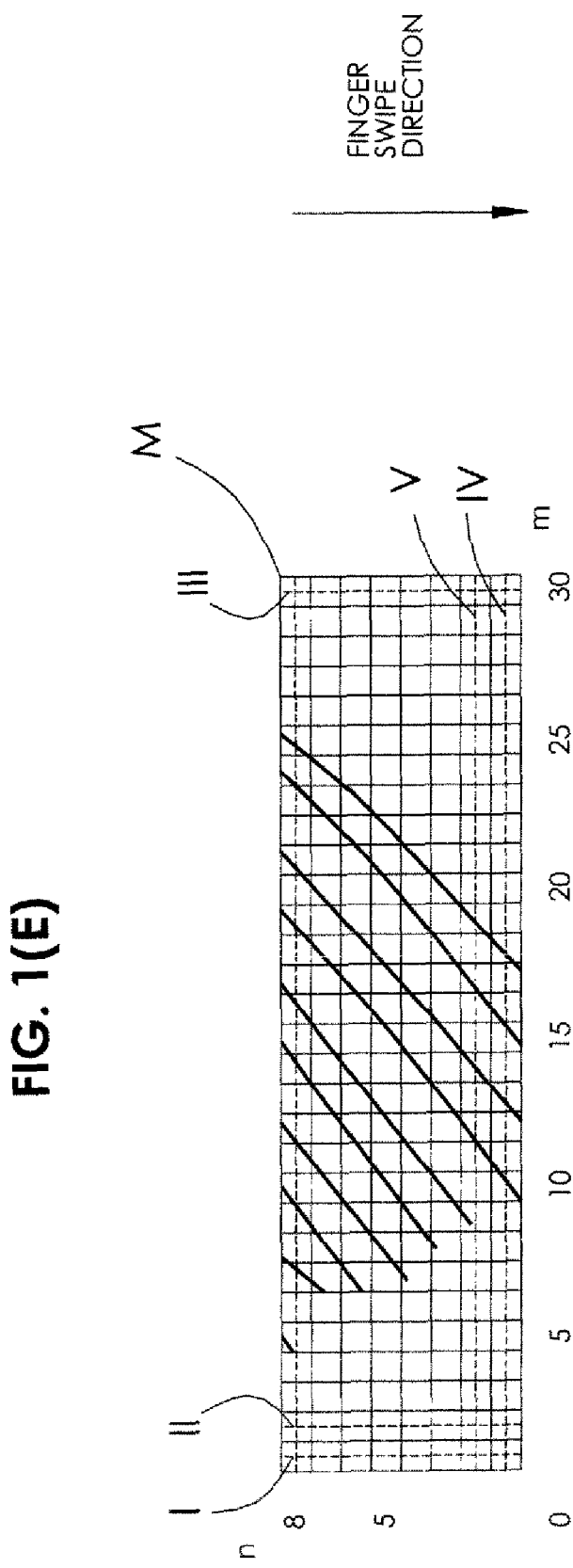
FIG. 1(E) is a snap shot of a scan line data diagram illustrating scanning lines of a fingerprint from a "Swipe" fingerprint sensor.
Figure 1F:
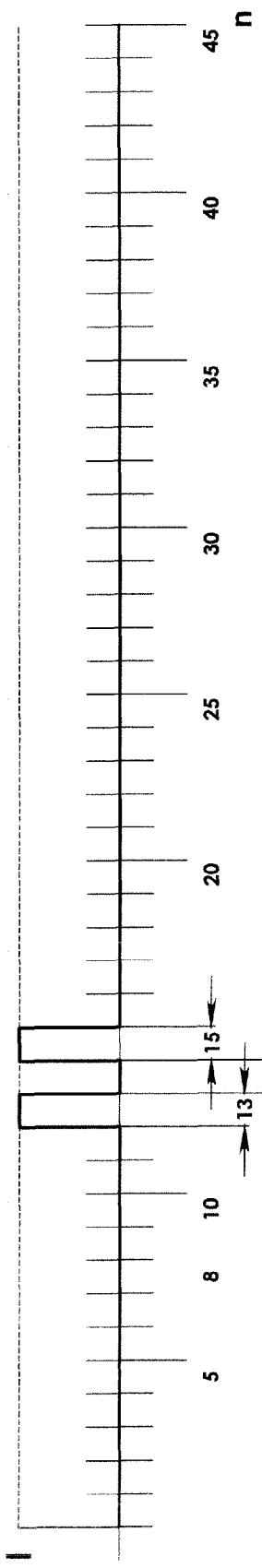
FIGS. 1(F)-1(H) are scan line data diagrams each illustrating one scan line of a fingerprint from FIG. 1(D).
Figure 1G:
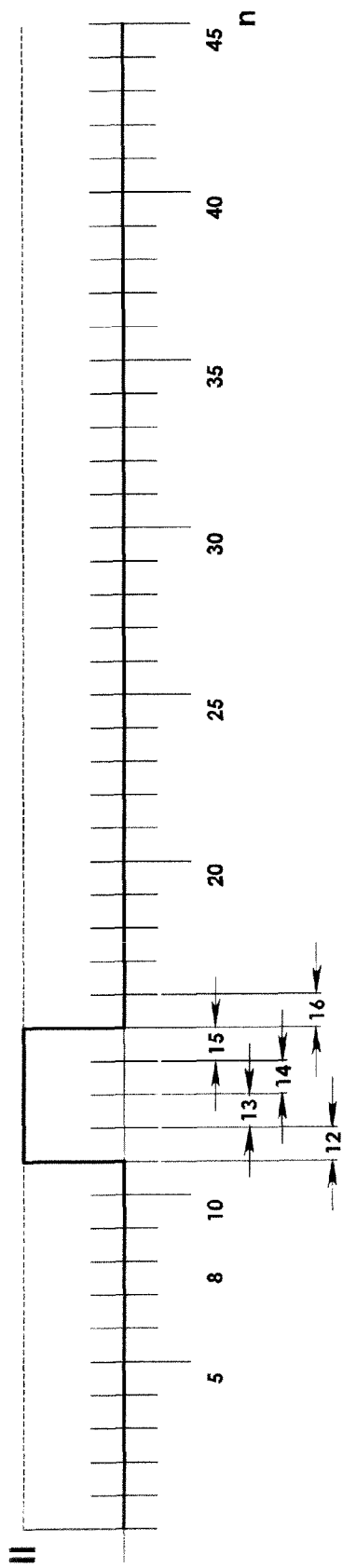
Figure 1H:
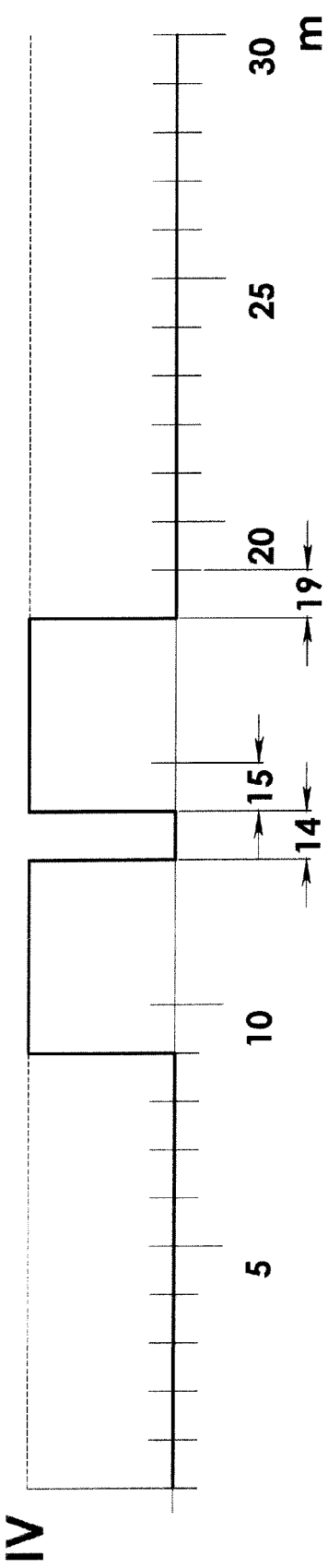

Referring to FIG. 1(F), the scan cells (1'13), (1'15) generate a high logic signal, respectively, and the other scan cells generate a lower logic signal for the first scanning line (I) in the column direction in FIG. 1(D). FIG. 1(G) illustrates the scan line data obtained for the second scanning line (II) in the column direction. FIG. 1(H) illustrates the scan line data obtained for the first scanning line (IV) in the row direction. In view of the unique features of fingerprints, if the card holder is different from the assigned user, the fingerprint scan data will differ from the fingerprint reference data.

As shown in FIG. 1(E), the fingerprint sensor versus the one in the FIG. 1(D) can reduce number of column sector cells such as 8 to reduce the cost. The user need to press and "Swipe" up and down thru the surface of the fingerprint sensor. The firmware of the processing unit will reconstruct the virtual image of the fingerprint shown in FIG. 1(D) thru many snap shots of the fingerprint sensor. The multi line of the "swipe" sensor is for the purpose of compensating the different swiping speed of the holder of the card body.

Referring back to FIG. 1(B), processing unit 102 receives the fingerprint scan data from the fingerprint sensor 104, and compares the fingerprint scan data with the fingerprint reference data stored in the memory device 103 to verify if the holder of the card body is the assigned user. The processing unit 102 activates the interface circuit 105 for exchanging card information with the host Computer Motherboard 109 via Interface Bus 113 upon verifying that the holder of the card body is the assigned user (e.g., a user authorized to use or access content stored within the device). Thus, the integrated circuit card 120 cannot be used if the card holder is not the assigned user.

The card information can be selected via a function key set and a display of the host computer. For example, when the function key set is selected in a credit card mode, the card information exchanged with the host Computer Motherboard 109 includes a credit card number. In one embodiment, a segment of the fingerprint reference data stored in the memory device is transmitted by the processing unit 102 to the host Computer Motherboard 109 upon verifying that the holder of the card body is the assigned user for increased security of network transaction. The segment of the fingerprint reference data includes selected ones of the scan line data selected according to date or time of the exchange of the card information with the host Computer Motherboard 109. Alternatively, the selected ones of the scan line data can be selected in a random manner.

According to certain embodiments of the invention, an integrated circuit card is capable of establishing a communications link with a host computer. In one embodiment, an integrated circuit card includes a card body, a memory device mounted on the card body for storing fingerprint reference data obtained by scanning a fingerprint of an assigned user, and for storing card information. The integrated circuit card further includes a fingerprint sensor mounted on the card body and adapted to scan a fingerprint of a holder of the card body and to generate fingerprint scan data and a processing unit mounted on the card body and connected to the memory device. The processing unit receives the fingerprint scan data from the fingerprint sensor and compares the fingerprint scan data with the fingerprint reference data in the memory device to verify if the holder of the card body is the assigned user. The processing unit activates the input/output interface circuit for exchanging the card information with the host computer to verify that the holder of the card body is the assigned user.

The fingerprint reference data includes various scan line data, where each of which describes fingerprint characteristics in a respective scanning line of the fingerprint of the assigned user.

The fingerprint sensor includes an m×n array of scan cells that defines a fingerprint scanning area. The fingerprint scan data includes a plurality of scan line data obtained by scanning corresponding lines of the array of scan cells. The lines of the array of scan cells are scanned either in a row direction of the array in a column direction of the array. Each of the scan cells generates a first logic signal upon detection of the ridge in the fingerprint of the holder of the card body, and a second logic signal upon detection of a valley in the fingerprint of the holder of the card body. The memory device may be a flash memory having multi-level memory cells.

The scan line data of the fingerprint reference data is of a fingerprint scanning area having columns and rows from the scanned fingerprint of the assigned user, and each scan line data is numbered. Each numbered scan line data corresponds to a line selected from the group consisting of an even scanning line in the column direction of the fingerprint scanning area, an odd scanning line in the column direction, an even scanning line in the row direction, and an odd scanning line in the row direction.

Since the electronic data storage compares fingerprint scan data obtained by scanning a fingerprint of a user of the device with the fingerprint reference data in the memory device to verify if the user is the assigned user, the electronic data storage can only be used by the assigned user so as to reduce the risks involved when the electronic data storage is stolen or misplaced. Therefore, the enhanced features of security options of password and fingerprint verification are so important. Its applicable besides to the flash memory device could protect documents in other media devices such as audio, video, movie, etc.

Figure 1I:
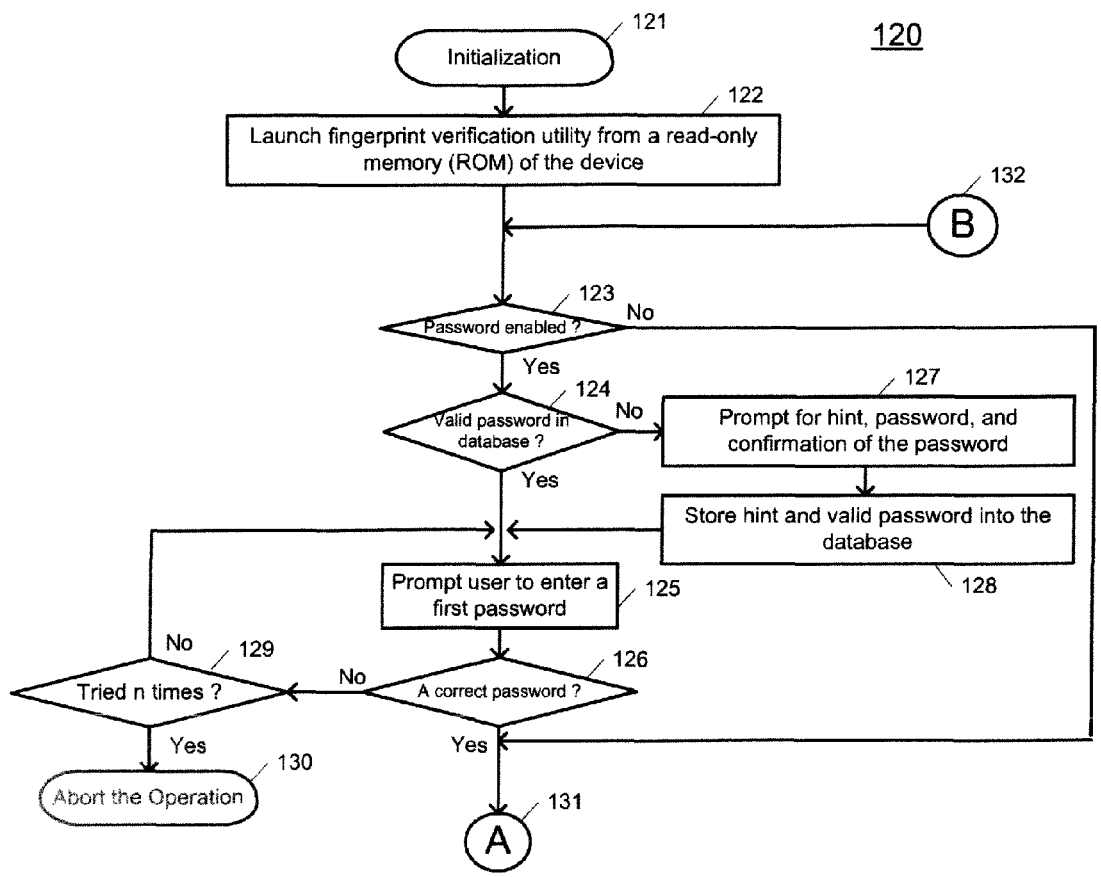
FIG. 1(I)-1(L) are flow diagrams illustrating various security processes using fingerprint features of USB flash memory devices according to certain embodiments of the invention.
Figure 1J:
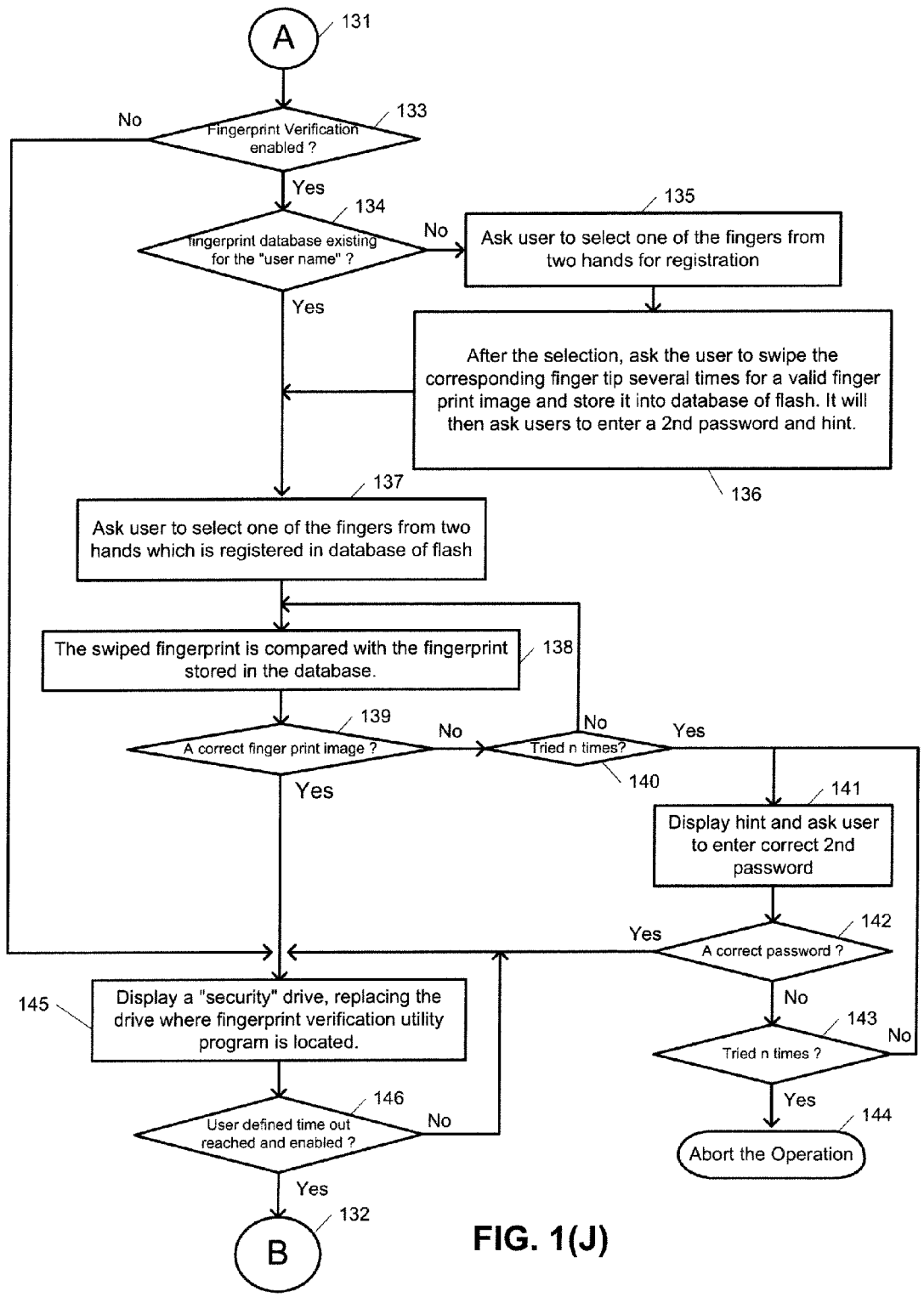
Figure 1K:
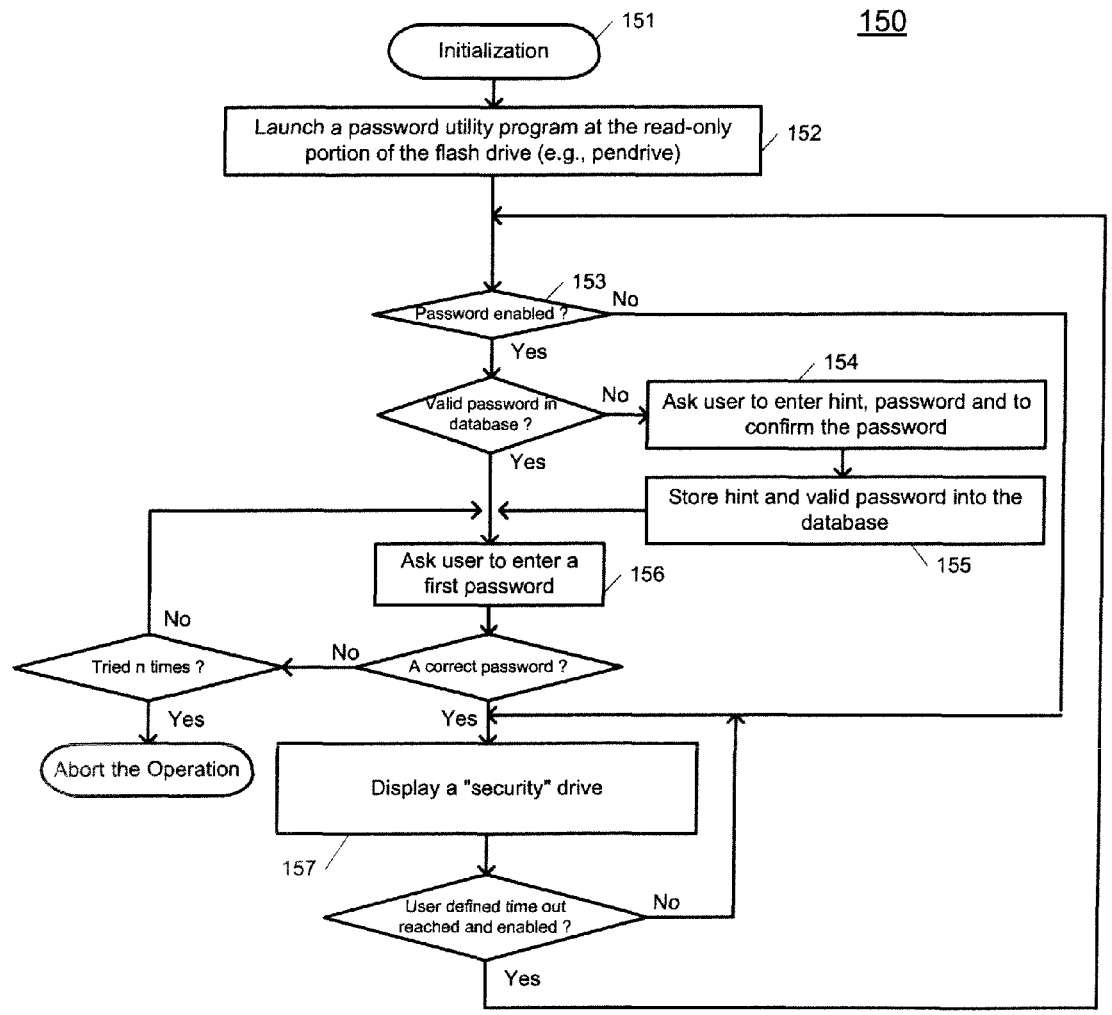

FIGS. 1(I) and 1(J) are flow diagrams illustrating a process for the fingerprint USB flash memory device to get through both enhanced security options of password and fingerprint verification, according to one embodiment of the invention. Note that process 120 may be performed by processing logic which may include hardware, software, or a combination of both. Now referring to FIG. 1(I), at the start, right after user plugs in the flash memory device at block 121, user has to run a verification utility program stored in the read-only portion of the non-volatile memory of the fingerprint drive device at block 122. Then if a password verification (enabled) is required at block 123 unless the user has decided to skip this process in the later part of the process. The password and fingerprint verification functions are enabled after manufacturing MP tool bring up. If there is no password stored in a system database (e.g., brand new device) at block 124, user is then asked to enter hint and password and to confirm password at block 127. Hint and password are then stored into the system database at block 128 accordingly. If user is not new and already has a password stored in the system database, at block 125 user is asked to enter a first password. At block 126, a wrong password will loop the user to n times of other attempts allowed to enter the right password or abort (block 130) the operation after n times of tryout (block 129), where n is defined by the system or an administrator. A correct password will allow the user to proceed to operations 131 in FIG. 1(J). Again a user has an option to skip the entire password verification at the later part of the process.

FIG. 1(J) is a flow diagram illustrating a process of fingerprint verification according to one embodiment of the invention. The process is typically (enabled) required at block 133 unless a user has decided to skip this process at the end of the later part of the process. At first time usage with no fingerprint record existed in the system database at block 134, the user is asked to select one of the fingers from both hands for registration at block 135. After the selection, at block 136, the user is asked to swipe his/her corresponding finger tip multiple (e.g., m) times allowed for a valid fingerprint image which will be stored in the system database of flash memory, where m is defined by the system. Next, the user is then asked to enter a second password and hint for a reason will be further explained in the next step. If the user is not a first time user and already has fingerprint image in the system database, at block 137, the user is asked to select one of the fingers from two hands which have been registered in the system database of flash memory. The swiped fingerprint is compared with the fingerprint reference data stored in the system database at block 138. An incorrect fingerprint image will loop user to n times of other attempts allowed to swipe the correct fingerprint image or an option to continue without fingerprint verification by entering correct second password which is already stored (n times allowed) or abort the operation (blocks 139-144). A correct fingerprint image will allow the user to proceed to access the 'Security' drive at block 145. At that situation, the security utility program allows user an option to skip the password or fingerprint verification (enabled) as mentioned above at block 146. A 'No' option will allow user to skip one or both password and fingerprint verification subsequently. A 'Yes' option will allow user to access 132 the flash memory device but will require password and fingerprint verification for the future usages.

FIG. 1 (K) is a flow diagram illustrating a process for the USB flash memory device to get through enhanced security option of password verification according to one embodiment of the invention. Process 150 may be performed by processing logic which may include hardware, software, or a combination of both. Now referring to FIG. 1(K), at the start, right after user plugs in the flash memory device at block 151, a user has to run the password utility program stored in the read-only portion of the non-volatile memory of the device at block 152. Then a password verification (enabled) is required unless the user has decided to skip this process in the later part of the process. The password functionality is enabled after MP tool bring up (block 153). If there is no password stored in the system database (e.g., brand new device), at block 154, the user is then asked to enter hint and password and to confirm the entered password. Hint and password are then stored into the system database at block 155 accordingly. If the user is not new and already has password stored in the system database, at block 156, the user is asked to enter a first password. A wrong password will loop the user to n times of other attempts allowed to enter a correct password or abort the operation after n times of tryout, where n is defined by the system or an administrator. A correct password will allow user to proceed to access the 'Security' drive (e.g., secured storage portion) at block 157. At that situation, the security utility program provides the user an option to skip the subsequent password verification (enabled) as mentioned above. A 'No' option will allow user to skip password verification. A 'Yes' option will allow user to access the flash memory device but will require password verification for the future usages.

Figure 1L:
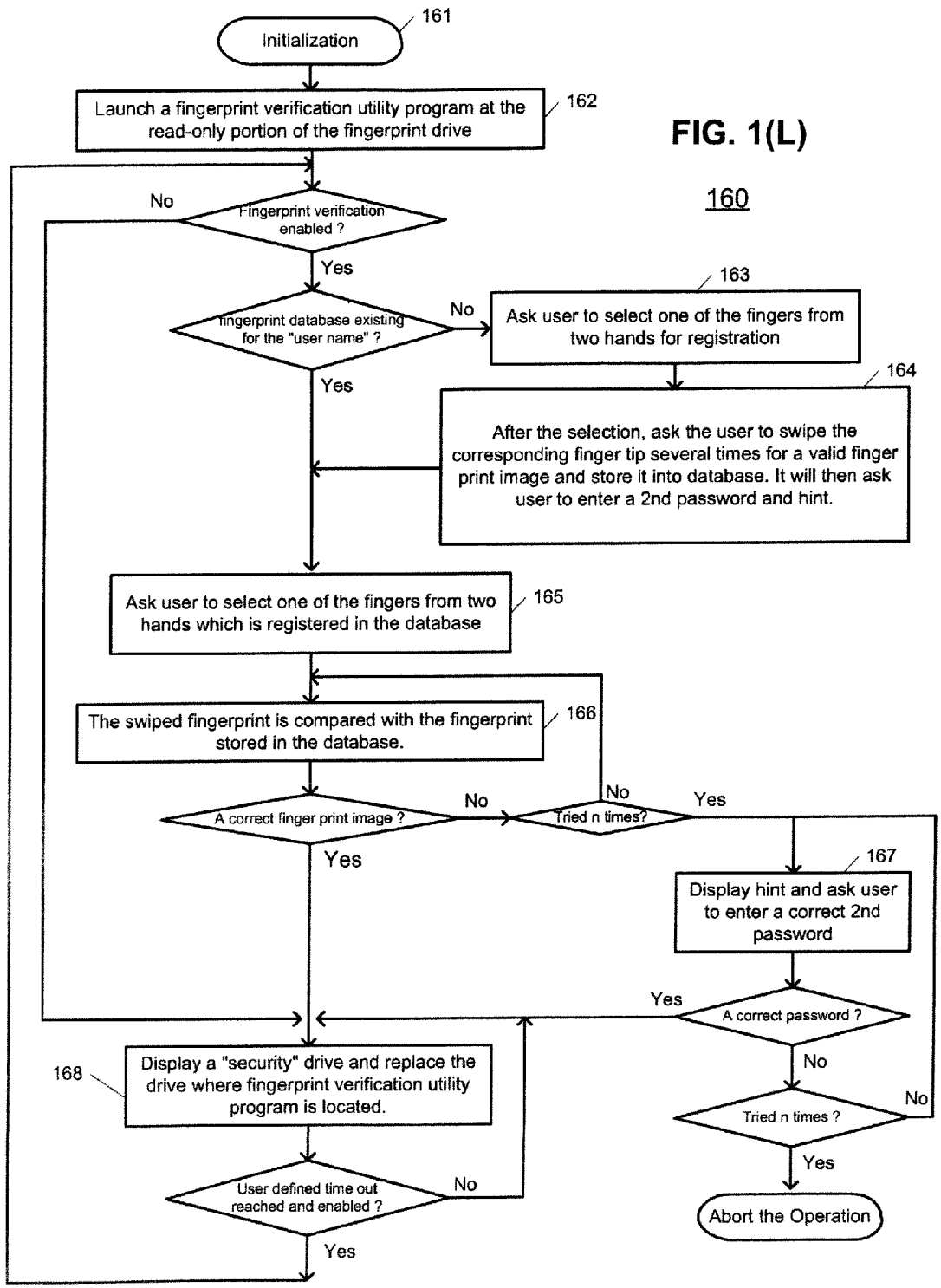

FIG. 1(L) is flow diagram illustrating a process for the fingerprint USB flash memory device to get through enhanced security option of fingerprint verification according to one embodiment of the invention. Process 160 may be performed by processing logic which may include hardware, software, or a combination of both. Now referring to FIG. 1(L), at the start, right after a user plugs in the flash memory device at block 161, user has to run the finger verification utility program stored in the read-only portion of the non-volatile memory of the fingerprint drive device at block 162. Then a fingerprint verification (enabled) is required unless user has decided to skip this process in the later part of the process. If there is no fingerprint record existed in the system database, the user is asked to select one of the fingers from 2 hands for registration at block 163. After the selection, at block 164, the user is asked to swipe his/her corresponding finger tip m times allowed for a valid fingerprint image which will be stored in the system database of flash memory, where m is defined by the system. Next the user is then asked to enter a second password and hint for a reason will be further explained in the next step. If the user is not a first time user and already has fingerprint image stored in the system database, at block 165, the user is asked to select one of the fingers from 2 hands which are registered in the system database of flash memory. The swiped fingerprint is compared with the fingerprint stored in the system database at block 166. An incorrect fingerprint image will loop user to n times of other attempts allowed to swipe the correct fingerprint image or an option to continue without fingerprint verification by entering correct second password at block 167 which is already stored (n times allowed) or abort the operation. A correct fingerprint image will allow user to proceed to access the 'Security' drive at block 168. At that situation the security utility program provides the user an option to skip the subsequent fingerprint verification (enabled) as mentioned above. A 'No' option will allow user to skip fingerprint verification. A 'Yes' option will allow user to access the flash memory device but will require fingerprint verification for the next use.

Figure 1M:
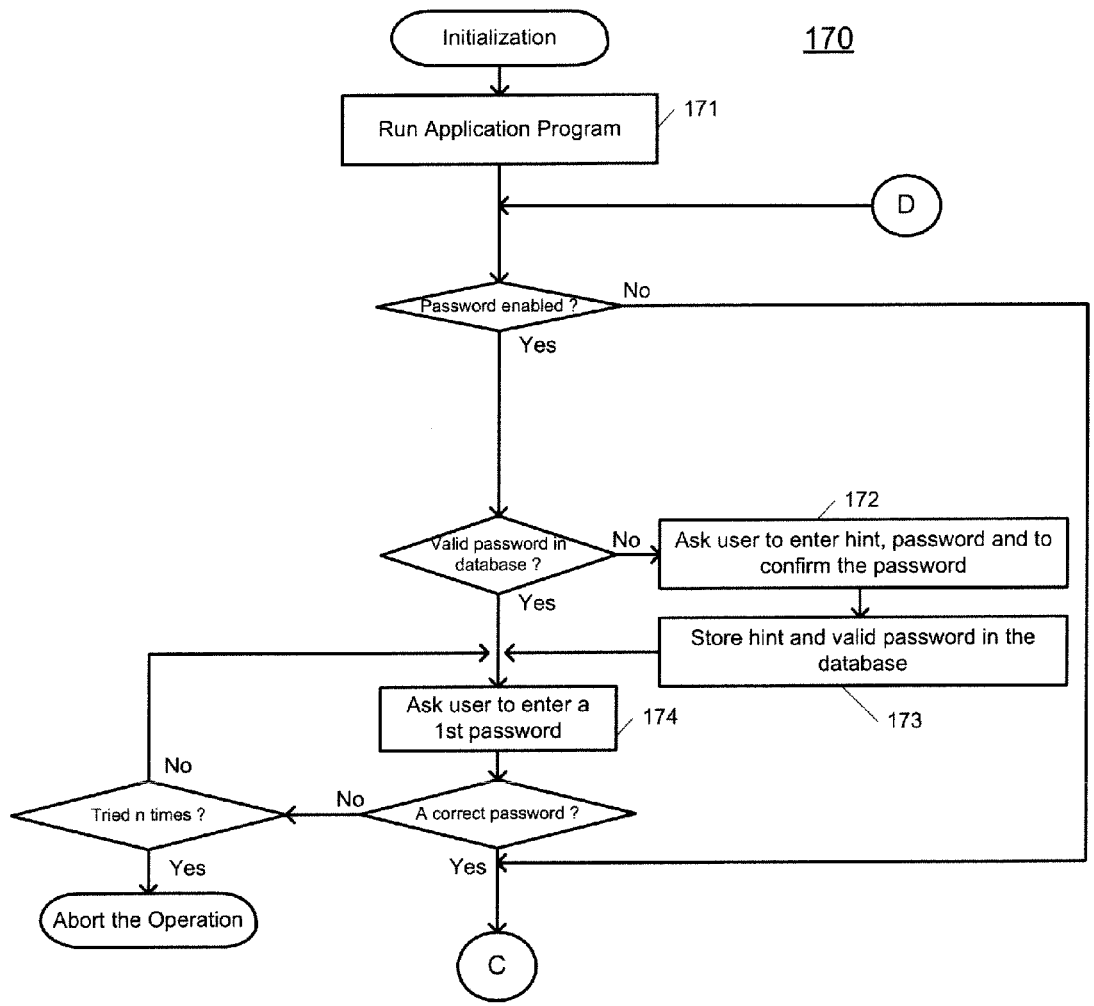
Figure 1N:
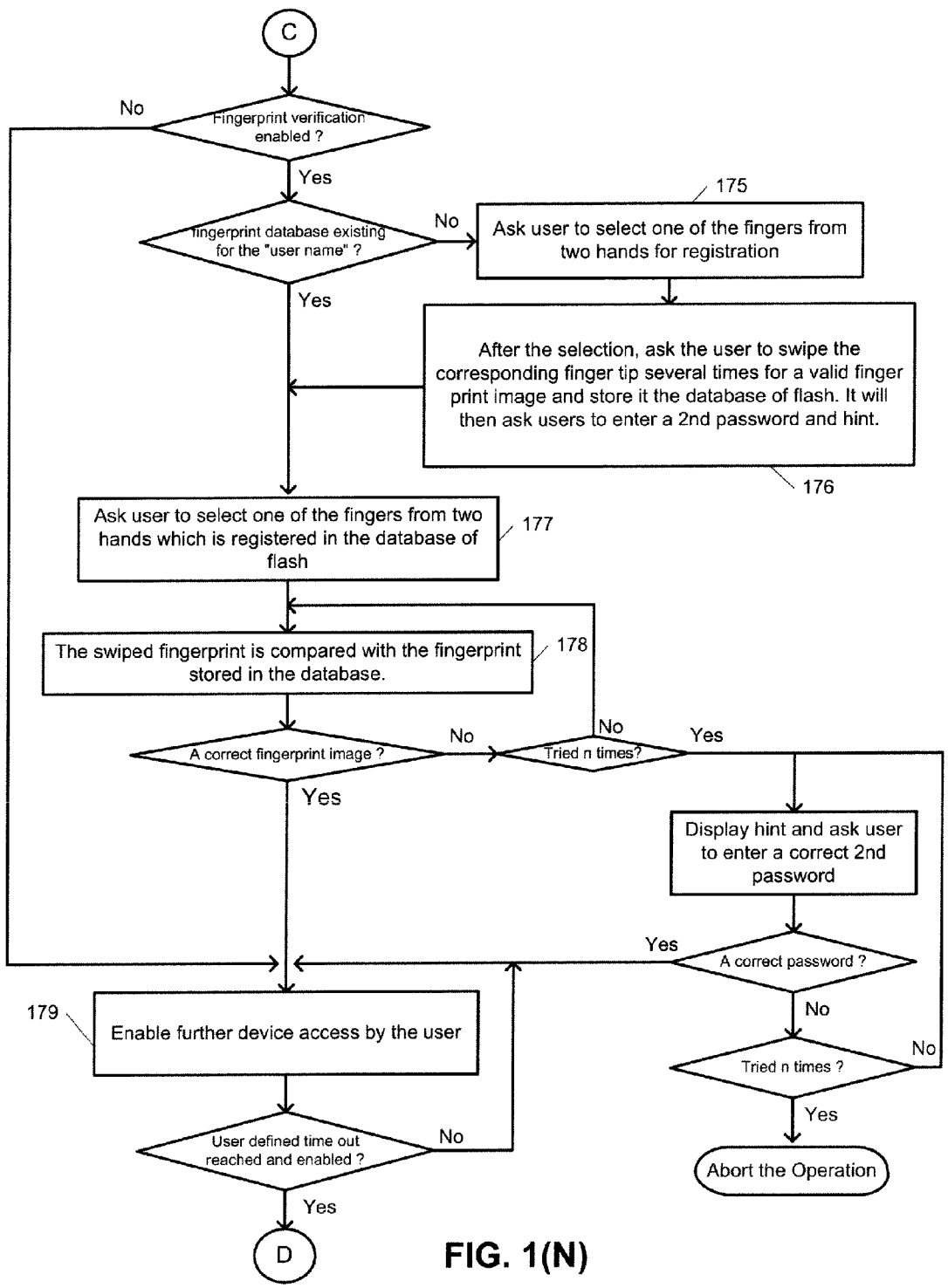

FIGS. 1(M) and 1(N) are flow diagrams illustrating a process for a portable device (e.g., notebook computer with fingerprint features) to get through both enhanced security options of password and fingerprint verification according to another embodiment of the invention. Note that process 170 may be performed by processing logic which may include hardware, software, or a combination of both. Now referring to FIG. 1(M), at the start, right after a user powers up or resets a portable device such as a notebook, at block 171, the user has to run the application program from the notebook. Then a password verification (enabled) is required unless the user has decided to skip this process in the later part of the process. Typically, password and fingerprint verification functionalities are enabled before the product is released to the user. If there is no password stored in the system database (e.g., brand new notebook), at block 172, the user is then asked to enter a hint and a password and to confirm the entered password. Hint and password are then stored into the system database within the notebook accordingly at block 173. If user is not new and already has a password stored in the system database, at block 174, the user is asked to enter a first password. A wrong password will loop the user to n times of other attempts allowed to enter the right password or abort the operation after n times of tryout, where n is defined by the system. A correct password will allow user to proceed to operations in Figure 1(N). Again the user has an option to skip the entire password verification at the later part of the process.

Continue to FIG. 1(N), after the selection at block 175, the user is asked to swipe his/her corresponding finger tip m times allowed for a valid fingerprint image which will be stored in the system database of the notebook at block 176, where m is defined by the system or an administrator. Next the user is then asked to enter a second password and hint for a reason which will be further explained in the next step. If the user is not a first time user and already has a fingerprint image stored in the system database, at block 177, the user is asked to select one of the fingers from two hands which have been registered in the system database of the notebook. The swiped fingerprint is compared with the fingerprint stored in the system database at block 178. An incorrect fingerprint image will loop the user to n times of other attempts allowed to swipe the correct fingerprint image or an option to continue without fingerprint verification by entering correct second password which has been already stored (n times allowed) or abort the operation. A correct fingerprint image will allow user to enable further notebook access at block 179. At that situation the access program provides the user an option to skip subsequent password or fingerprint verification (enabled) as mentioned above. A 'No' option will allow user to skip one or both password and fingerprint verification. A 'Yes' option will allow user to access the notebook but will require password and fingerprint verification for the next use.

Figure 1O:
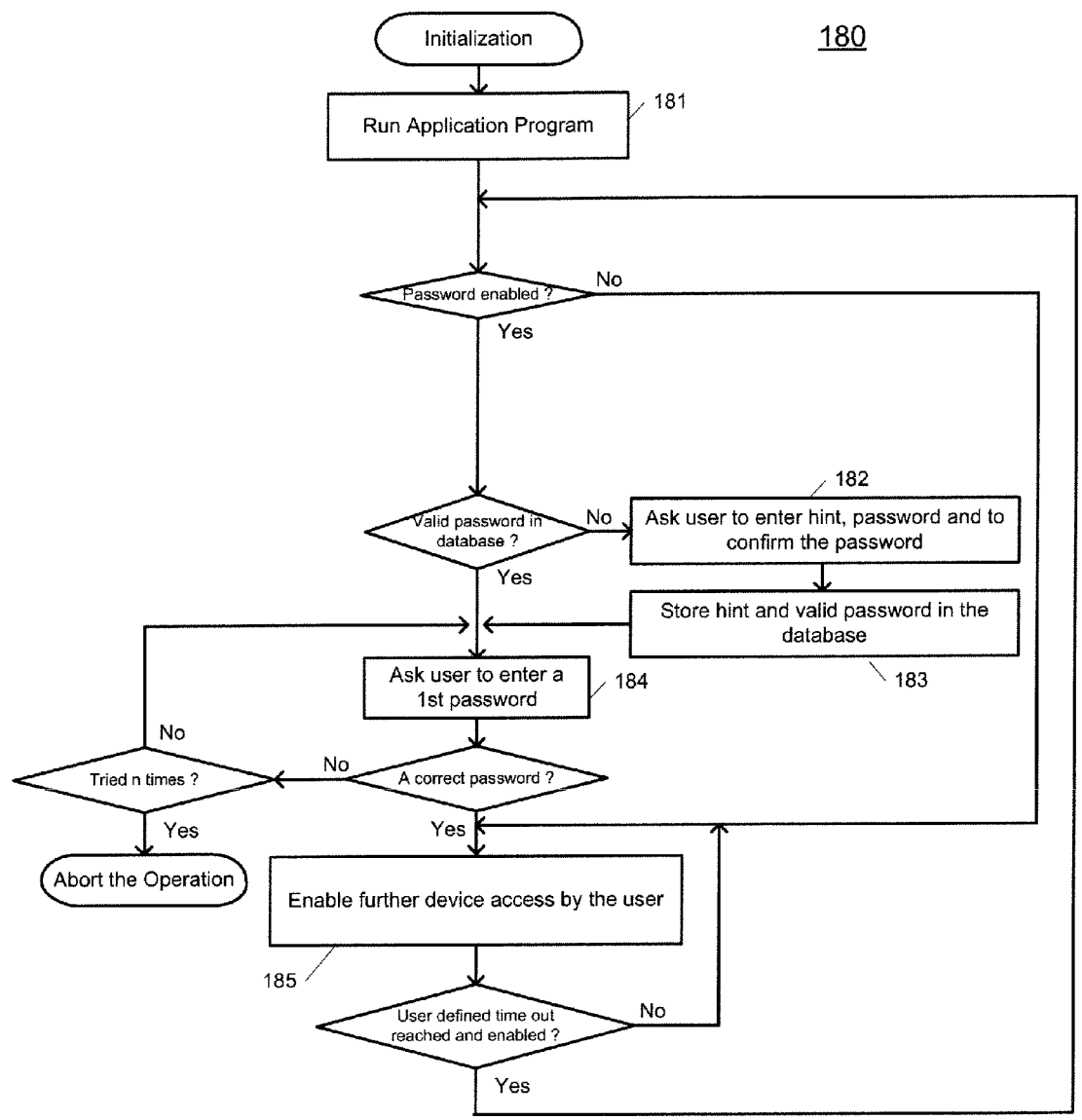

FIG. 1(O) is flow diagram illustrating a process for the notebook to get through enhanced security option of password verification according to one embodiment of the invention. Note that process 180 may be performed by processing logic which may include hardware, software, or a combination of both. Now referring to FIG. 1(O), at the start, right after a user powers up or resets the notebook, at block 181, the user has to run the application program. Then a password verification (enabled) is required unless the user has decided to skip this process in the later part of the process. The password verification functionalities are enabled before the product released to the user. If there is no password stored in the system database (e.g., brand new notebook), at block 182, the user is then asked to enter a hint and a password and to confirm the entered password. Hint and password are then stored into the system database at block 183 accordingly. If the user is not new and already has password in the system database, at block 184, the user is asked to enter a first password. A wrong password will loop user to n times of other attempts allowed to enter the right password or abort the operation after n times of tryout, n is defined by the system. A correct password will allow the user to enable further notebook access at block 185. At that situation the access program allows user an option to skip the password verification (enabled) as mentioned above. A 'No' option will allow user to skip password verification. A 'Yes' option will allow user to access the notebook but will require password verification for the next use.

FIG. 1(P) is a flow diagram illustrating a process for a portable device such as a notebook computer having fingerprint features (e.g., a fingerprint sensor communicatively attached therein) to get through enhanced security option of fingerprint verification according to another embodiment of the invention. Note that process 190 may be performed by processing logic which may include hardware, software, or a combination of both. Now referring to FIG. 1(P), at the start, right after a user powers up or resets a portable device such as a notebook computer, at block 191, the user runs an application program from the notebook. Then a fingerprint verification (enabled) is required unless the user has decided to skip this process in the later part of the process. At block 192, if there is no fingerprint record existed in the system database, the user is asked to select one of the fingers from 2 hands for registration. After the selection, at block 193, the user is asked to swipe his/her corresponding finger tip one or more times, but not exceeding m times allowed for a valid fingerprint image which will be stored in the system database of the notebook, where m is predefined by the system (e.g., an administrator). Next the user is then asked to enter a second password and hint for a reason will be further explained in the next step. If user is not a first time user and already has a fingerprint image stored in the system database, at block 194, the user is asked to select one of the fingers from 2 hands which have been registered in the system database of the notebook. The swiped fingerprint is then compared with the fingerprint reference data stored in the system database at block 195. An incorrect fingerprint image will loop the user to n times of other attempts allowed to swipe the correct fingerprint image or an option to continue without fingerprint verification by entering correct second password which is already stored (n times allowed) or abort the operation. A correct fingerprint image will allow the user to enable further notebook access at block 196. At that situation the access program allows user an option to skip subsequent or future fingerprint verification (enabled) as mentioned above. A 'No' option will allow user to skip fingerprint verification. A 'Yes' option will allow user to access the notebook but will require fingerprint verification for the next time.

Figure 2A:
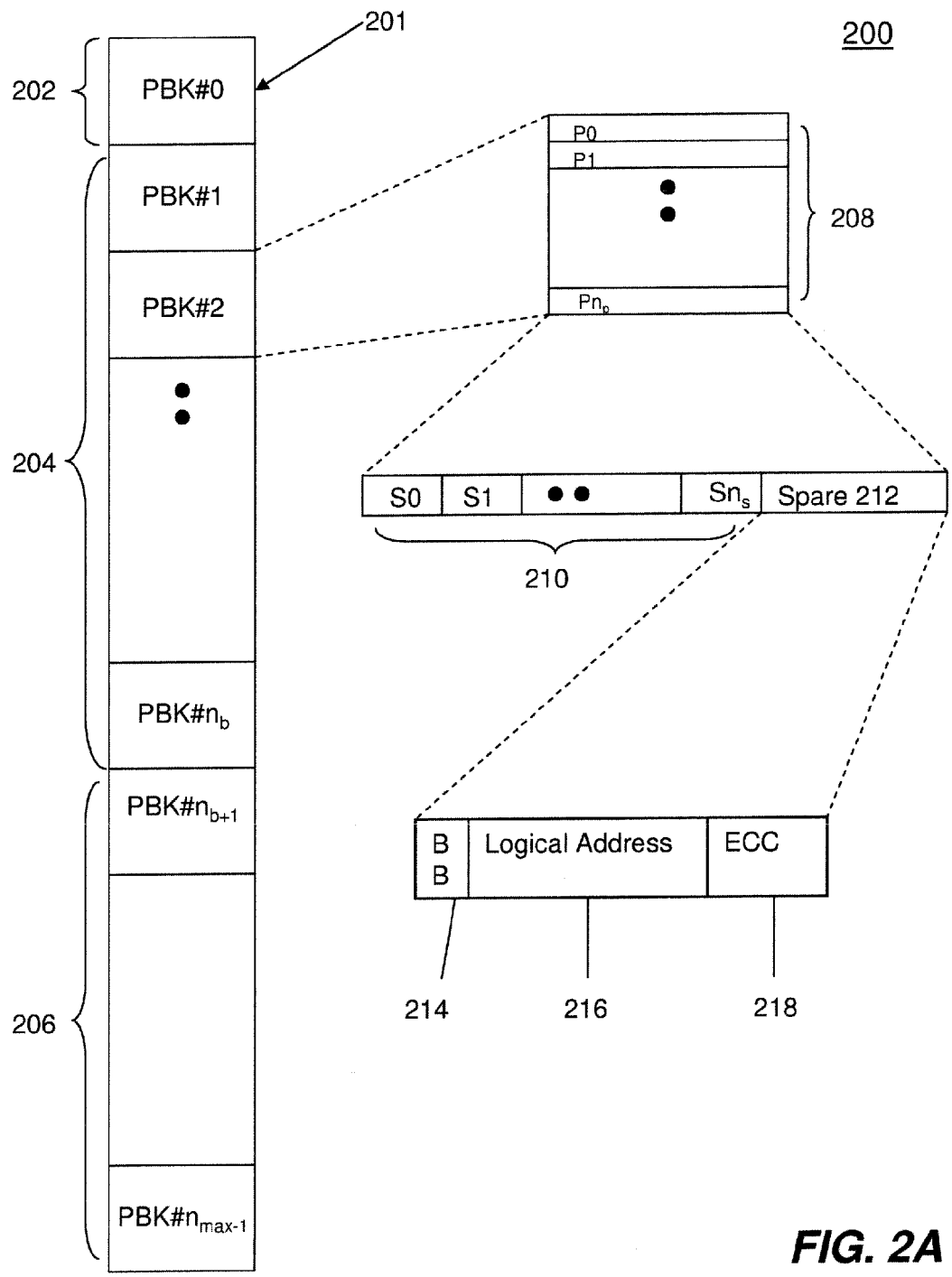
FIG. 2(A) is a diagram depicting a data structure of a large capacity flash memory according one embodiment of the invention.

Referring now to FIG. 2A, which is a diagram depicting an exemplary data structure 200 of a flash memory module 201 (e.g., flash memory module 103 of FIG. 1C) in accordance with one embodiment of the present invention. The flash memory module 201 is divided into a plurality of physical blocks e.g., PBK#0, PBK#1, PBK#2, . . . ). In general, there are three categories of physical blocks: 1) the first block 202 (i.e., PBK#0); 2) normal usage data blocks 204 (i.e., PBK#1, PBK#2, . . . , PBK#nb); and 3) reserved blocks 206 (i.e., PBK#nb+1, PBK#nmax−1). The first block (PBK#0) 202 is guaranteed to be a good block and used by the manufacturer to store certain information such as Flash Timing Parameter (FTP), and other information by Initial Manufacturing Program (IMP), which cannot be alter by users. The manufacturer may define a percentage (e.g., 95%) of the total capacity as normal usage data blocks and the rest as reserved. The normal usage data blocks 204 are configured for user to store user data, although the first block (i.e., PBK#1) of the normal usage data blocks 204 is generally used for storing Master Boot Record (MBR), which contains critical data for operation of a computing device. Lastly, the reserved blocks 206 are configured to be accessed by a program module (e.g., FW)

via special memory addresses in accordance with one embodiment of the present invention. Examples of the special memory address are 0xFFFF0000, 0xFFFF0001, 0xFFFFFF00, 0xFFFFFF01, etc.

Figure 4A:
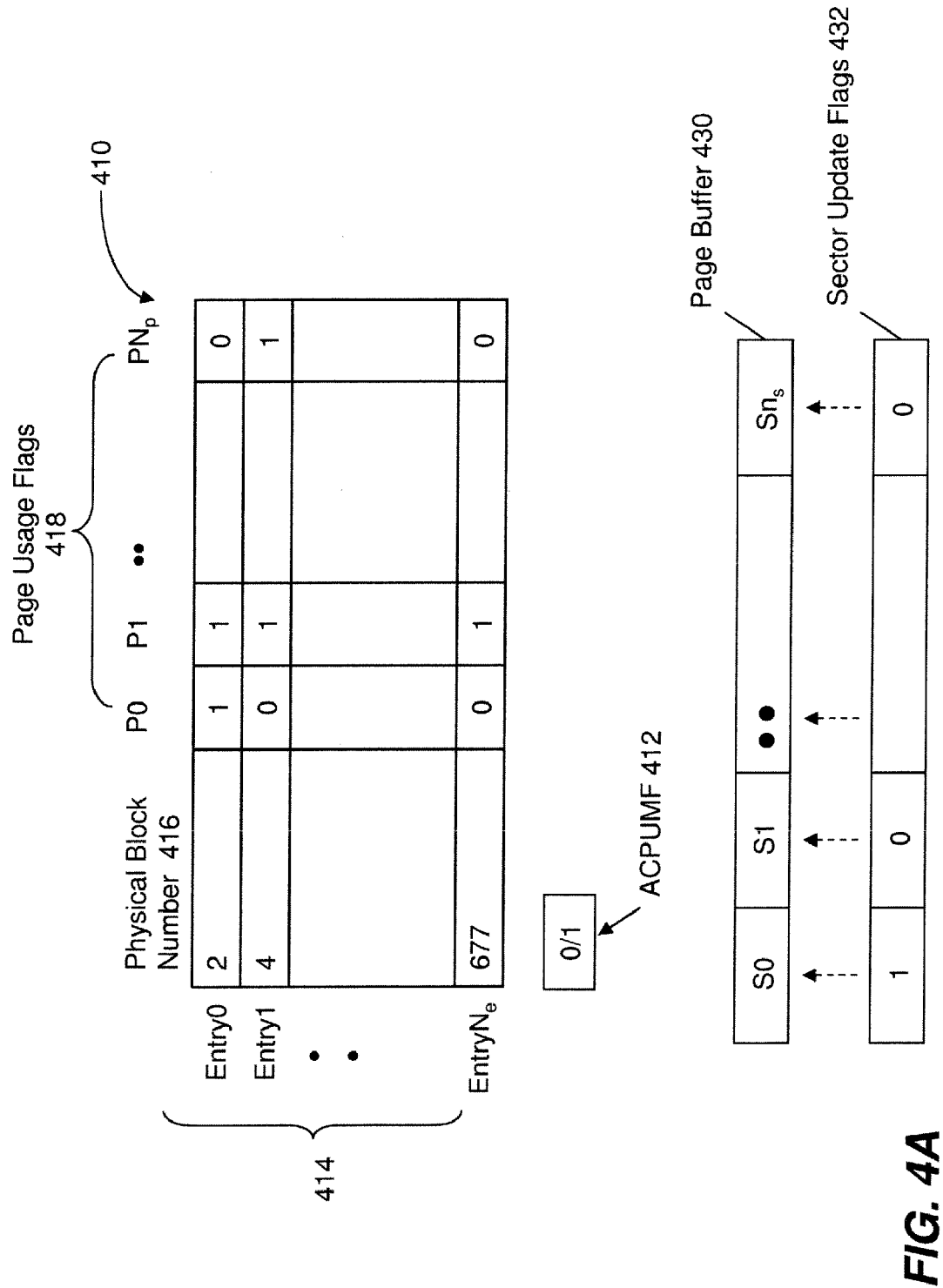
Figure 4B:
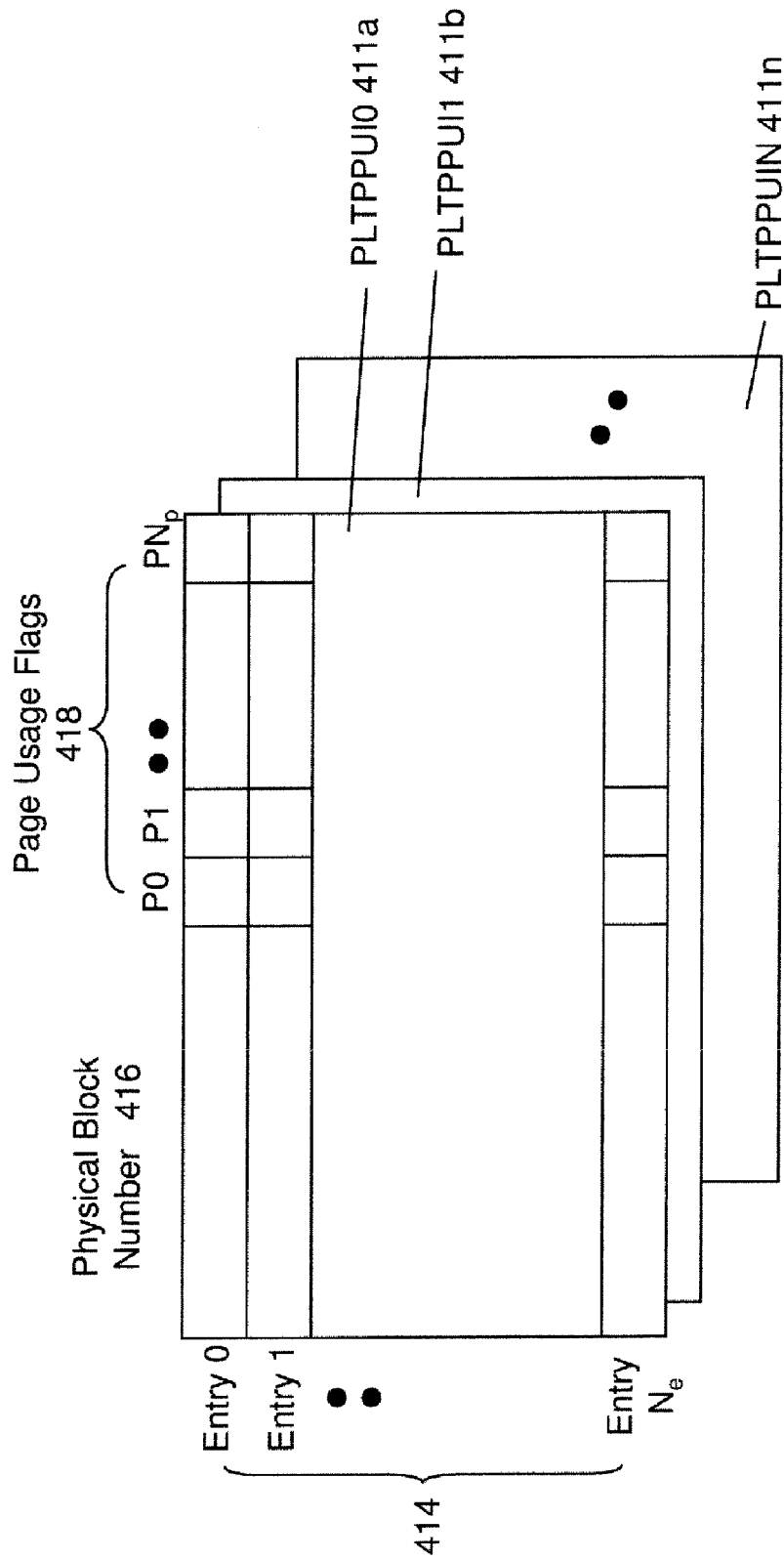

Each block is further divided into a plurality of pages 208 (e.g., P0, P1, ..., Pnp). Each of the pages 208 includes a data area 210 and a spare area 212. The data area is partitioned into a plurality of sectors (e.g., S0, S1, ..., Sns). In one embodiment, each sector stores 512-byte of data. The spare area 212 is configured to provide three different fields: 1) a block indicator (BB) 214, a logical address area 216 and an error correction code (ECC) area 218. When a block is tested no good by the manufacturer, the block indicator 214 of that block is set to a special code to indicate a bad block that cannot be used. The logical address area 216 is configured for identifying of that particular physical block for initialization of the flash memory device. More details are described in FIG. 4E and FIG. 4F for the reserved physical blocks as used by an embodiment of the present invention. Detailed processes of initialization are shown in FIGS. 7A-7E. The ECC area 218 is configured to store the ECC for ensuring data integrity.

In order to access the data stored in the normal usage blocks 204 of the flash memory module 201, the host computing device 109 transmits a data transaction request (e.g., data read or write) along with a logical sector address (LSA) to the flash memory device (e.g., flash memory device 140 of FIG. 1C). The processing unit 102 of the flash memory device converts the received LSA into a physical address (i.e., specific block, page and sector numbers) before any data transaction can be performed. Traditionally, the conversion is performed by an address look up table with a one-to-one relationship to the physical address. This solution works for a flash memory device with relatively small capacity, because the address look up table is implemented with a static random access memory (SRAM). It would not be feasible in terms of cost and physical space to include SRAM that grows linearly as the capacity of the flash memory device especially for a large capacity MLC based flash memory device. For example, a large capacity (say 32 Giga-Byte (GB)) MLC based flash memory device using 2112-byte page (i.e., 2048-byte data plus 64-byte spare) and 128 pages per block, it would require more than 2 MB bytes of SRAM to hold the entire address look up table.

Figure 2B:
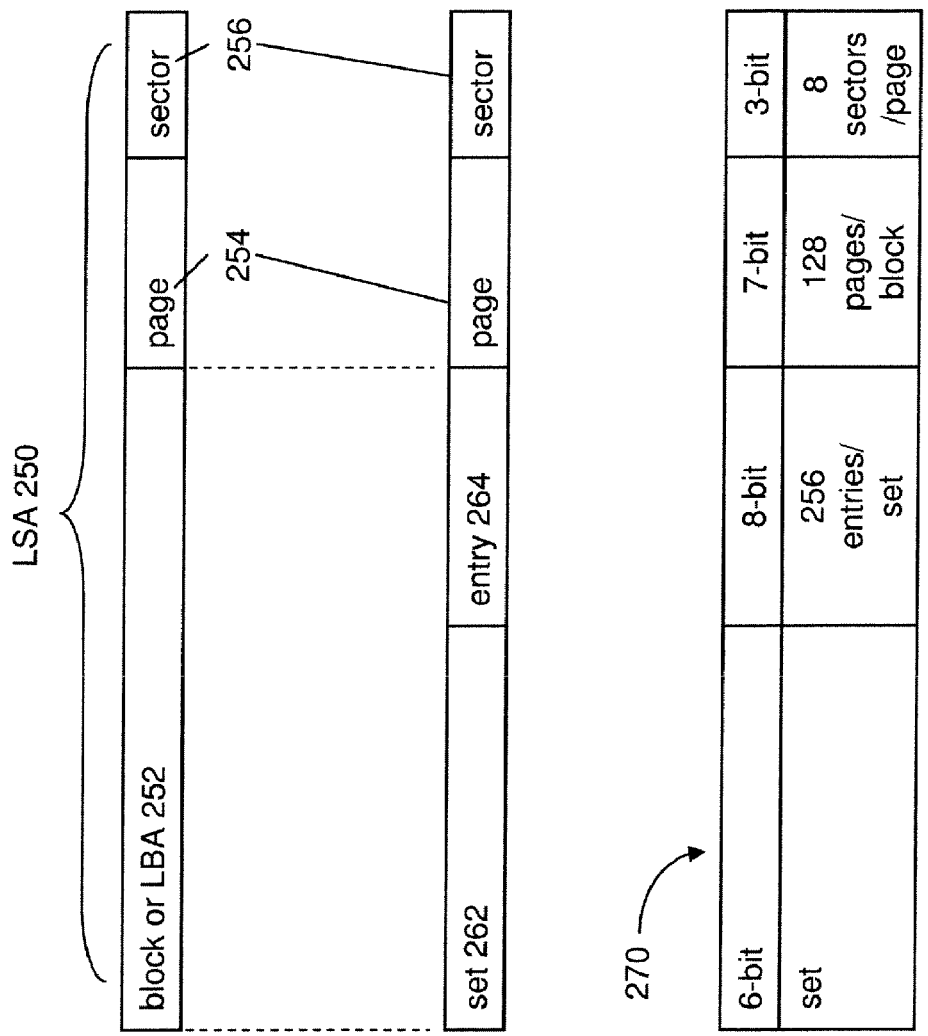
FIG. 2(B) is a diagram showing a scheme for partitioning a logical sector address in accordance with one embodiment of the invention.

FIG. 2B is a diagram showing an exemplary scheme for partitioning a logical sector address in accordance with one embodiment of the present invention. A logical sector address (LSA) 250 is traditionally partitioned as three parts: block 252, page 254 and sector 256. The block portion 252 is also referred to as logical block address (LBA). According to one aspect of the present invention, the LSA 250 is partitioned into four parts: set 262, entry 264, page 254 and sector 256. The page 254 and sector 256 remain the same. And the block 252 is further partitioned into two parts: the set 262 and the entry 264. In other words, instead of just using block 252 as basic unit, the blocks are divided into a plurality of sets 262. Each of the sets 262 includes a plurality of entries 264. For example, if a 24-bit LSA 270 is partitioned in the following manner: 6-bit for set, 8-bit for entry, 8-bit for page and 3-bit for sector, the LSA 270 could represent up to 64 sets of 256 entries (i.e., 16,384 blocks) with each block containing 128 pages and each page containing 8 sectors of 512-byte of data. In this document, the number of the plurality of sets is N, where N is a positive integer.

To carry out the address partition scheme of the present invention, the manufacturer may predefine number of sets and entries in the first physical block (i.e., PBK#0) by the IMP.

Instead of mapping all of the logical sector addresses (LSA) to a physical address in a memory, only a portion of the LSA (i.e., a set) is included such that only a limited size of memory is required for address correlation and page usage information. In other words, a limited size memory is configured to hold one set of entries with each entry including an address of the corresponding physical block and a plurality of corresponding page usage flags (see FIG. 4A for details). For example, 18-byte (i.e., 2-byte for the physical block address plus 128-bit or 16-byte for 128 page usage flags) is required for each entry, hence a total of 4608-byte of memory is required for a set with 256 entries.

However, in order to correlate a logical block address to a unique physical block, every entry in each of the plurality of sets must correlate to a unique physical address and a set of page usage flags. Since the limited size memory only has capacity of holding one set of such information, an embodiment of the present invention requires that information of all of the plurality of sets be stored in reserved area 206 of the flash memory 201. Only a relevant set of the plurality of sets is loaded into the limited size memory in response to a particular data transfer request from a host computing system 109. The relevant set is defined as the set with one of the entries matches the entry number derived from the LSA associated with the received data transfer request.

Since there are N sets of address correlation and page usage information stored in the flash memory, each of the N sets is referred to as a partial logical-to-physical address and page usage information (hereinafter 'PLTPPUI') appended with a set number (e.g., 'PLTPPUI0', 'PLTPPUI1', ..., 'PLTPPUIN').

In order to simplify the examples and drawings in the Specification, an example with small numbers is used for demonstrate the relationship between LSA, LBA, sector, page, entry and set numbers. Those of ordinary skill in the art will understand implementation of an embodiment of the present invention can be with larger numbers. The following example uses a flash memory with four sectors per page, four pages per block and four entries per set and a logical sector address 159 (i.e., LSA=159) is represented by a binary number "10 01 11 11". As a result, the least significant four bits of LSA represent sector and page numbers with the two lowest bits for the sector number and the next two for the page number, as each two-bit represents four distinct choices—0, 1, 2 and 3. After truncating the four least significant bits of LSA, the remaining address becomes the corresponding logical block address (LBA). In this example, LBA has a binary value of '1001'. Because there are four entries per set in this example, two least significant bits of LBA represent the entry number (i.e., offset number in each set). The remaining high bits of LBA represent the set number. A summary of this example is listed in Table 1.

TABLE 1

| 10 | 01 | 11 | 11 |
|---|---|---|---|
| Set Number | Entry Number | Page Number | Sector Number |

According to one aspect of the present invention, an indexing scheme enables the processing unit 102 to translate logical sector addresses (LSAs) and/or logical block addresses (LBAs) provided, in conjunction with a data transfer request, by the host computing device 109 to physical block numbers or addresses (PBK#) in the flash memory device 140. The indexing scheme comprises a plurality of sets of PLTPPUI and physical characteristics of the flash memory such as total number of sets, entries, pages and sectors. And ratios among the set, entry, page and sector. The processing unit 102 can utilize the indexing scheme to determine which sectors of the flash memory are available for each particular data transfer request.

Figure 3:
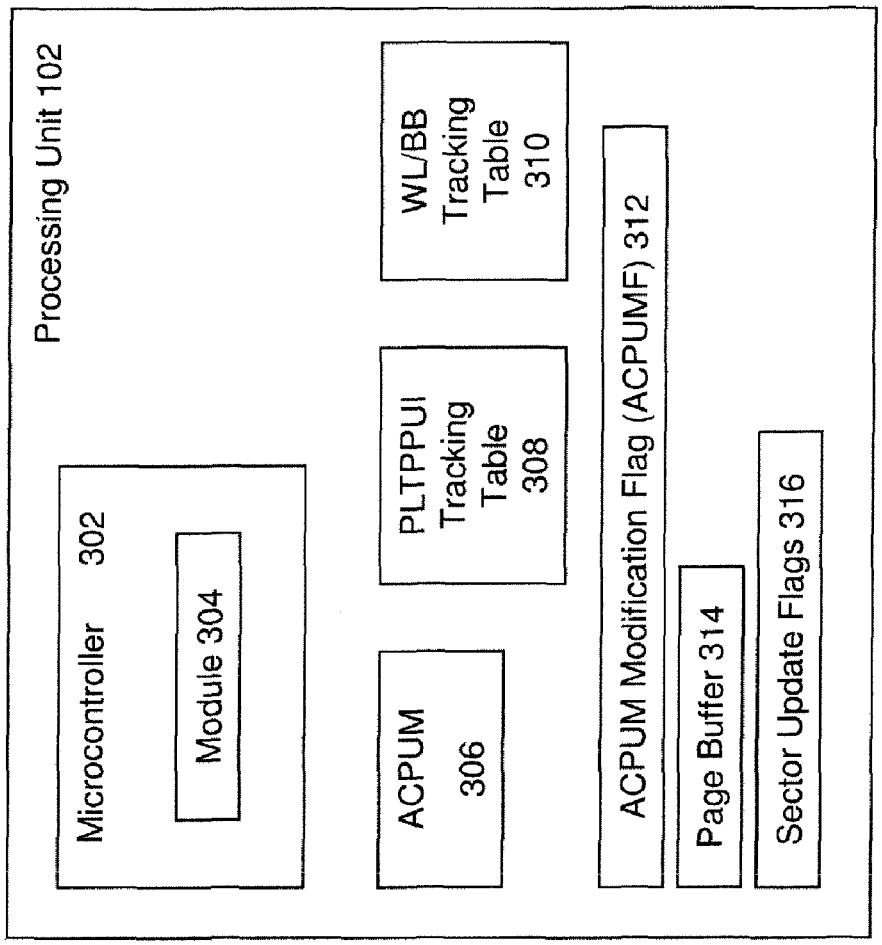
FIG. 3 is a simplified block diagram illustrating salient components of a processing unit of each of the electronic flash memory devices of FIGS. 1(A)-1(C), according to an embodiment of the invention.

FIG. 3 is a simplified block diagram showing salient components of the process unit 102 of an electronic flash memory device (e.g., flash memory devices 102 of FIG. 1C) in accordance with one embodiment of the present invention. The processing unit 102 comprises a microcontroller or microprocessor 302, an address correlation and page usage memory (ACPUM) 306, a PLTPPUI tracking table 308, a wear leveling and bad block (WL/BB) tracking table 310, a ACPUM modification flag (ACPUMF) 312, a page buffer 314 and a set of sector update flags 316.

The microcontroller 302 with a flash memory controlling program module 304 (e.g., a firmware (FW)) installed thereon is configured to control the data transfer between the host computing device 109 and the at least one flash memory module 103. The ACPUM 306 is configured to provide an address correlation table, which contains a plurality of entries, each represents a correlation between a partial logical block address (i.e., entries) to the corresponding physical block number. In addition, a set of page usage flags associated with the physical block is also included in each entry. The ACPUM 306 represents only one of the N sets of PLTPPUI, which is stored in the reserved area of the flash memory. In order to keep tracking the physical location (i.e., physical block number) of each of the N sets of PLTPPUI, the physical location is stored in the PLTPPUI tracking table 308. Each item is the PLTPPUI tracking table 308 corresponds a first special logical address to one of the N sets of PLTPPUI. The wear leveling counters and bad block indicator for each physical block is stored in a number of physical blocks referred by corresponding second special logical addresses (e.g., '0xFFFFFF00'). The WL/BB tracking table 310 is configured to store physical block numbers that are assigned or allocated for storing these physical block wear leveling counters and bad blocks. The ACPUM modification flag (ACPUMF) 312 is configured to hold an indicator bit that tracks whether the ACPUM 306 has been modified or not. The page buffer 314 is configured to hold data in a data transfer request. The page buffer 314 has a size equaling to the page size of the flash memory 201. The sector update flags 316 are configured to hold valid data flag for each of the corresponding sectors written into data area of the page buffer 314. For example, four sector update flags are be required for a page buffer comprising four sectors. The page buffer 314 also includes a spare area for holding other vital information such as error correction code (ECC) for ensuring data integrity of the flash memory.

FIGS. 4A-4F collectively show exemplary data structures used for managing memory addresses of the flash memory of FIG. 2A in accordance with one embodiment of the present invention. The ACPUM data structure 410 contains Ne rows of entries 414, where Ne is a positive integer. Each row contains a physical block number or address (PBK#) 416 and a plurality of page usage flags 418 associated with the PBK#. The number of pages (Np) is determined by the physical flash memory cell structure and defined by the IMP. ACPUMF 412 contains one bit, which is a toggle switch representing whether the ACPUM 306 has been modified or not. The ACPUMF 412 may be implemented as a register containing either 0 (not modified) or 1 (modified). The page buffer 430 includes a data area containing plurality of sectors (S1, S2, . . . , Sns) and a spare area (not shown in FIG. 4A) containing other information such as ECC. A set of sector update flags 432 is configured to represent respective sectors in the page buffer 430. Each of the sector update flags 432 indicates either a corresponding sector contains a valid data or not. In one implementation, valid data is represented as "1", while initial or stale state as "0". These flags may be implemented in a different logic such as reversing the binary representation. As discussed in the prior sections and shown in FIG. 4B, there are N sets of PLTPPUI 411a-n, where N is a positive integer. The N sets of PLTPPUI 411a-n represent all of the logical blocks in correlation with physical blocks. Only one of the N sets is loaded into the ACPUM 306 at one time.

Each set of the PLTPPUI is stored in the reserved area 206 of the flash memory 201 of FIG. 2A in a data structure 420 shown in FIG. 4C. The contents of each set of PLTPPUI are stored in one page of a physical block. For example, the PLTPPUI0 is stored at one of a plurality of first special logical addresses "0xFFFF0000", which corresponds to the first page (P0) 424a of a physical block 'PBK#1000' 422 initially. Due to the MLC flash memory data programming rules, each page can only be programmed or written once (i.e., NOP=1) and data programming within one block can only be in a ascending page order. The second data programming or write can only be into the second page (P1) 424b until the nth write to the last page (Pn) 424n of the block 'PBK#1000' 422. After that, the next data programming, the (n+1)th write, must be written to the first page (P0) 434 of a new physical block (PBK#1012) 432 just assigned or allocated according to the WL rules. In storing ACPUM 306 into the flash memory, each entry of the ACPUM 306 is written sequentially in the data area 425 of the page. When a first page of a new block is programmed, after the data area has been written, other vital information is written into the spare area 426. The other information include at least the following: a bad block indicator 427, the special logical address 428 issued by the FW for each of the N sets of PLTPPUI and a tracking number 429 for each special logical address. The bad block indicator 427 showing 'FF' means a good block. The first special logical address 442 may be '0xFFFF0000'. And the tracking number (TN) 446 is set to zero for an initial physical block corresponding to each of the first special logical addresses. The tracking number 446 is incremented by one as a new block is assigned or allocated for storing a particular set of PLTPPUI.

FIG. 4D is a diagram illustrating an exemplary data structure 440 of the PLTPPUI tracking table 308 of FIG. 3. The PLTPPUI tracking table 308 contains a plurality of rows representing a plurality of first special logical addresses 442, one for each of the N sets of PLTPPUI. Each of the N rows contains a physical block number 444, a tracking number (TN) 446 and highest page number 448. The first row of the PLTPPUI tracking table 308 corresponds to the example shown in FIG. 4C.

Similar to the data structure of the PLTPPUI tracking table, an exemplary data structure 450 of a WL/BB tracking table 310 is shown in FIG. 4E. Instead of first special logical addresses for each of the N sets of PLTPPUI, each row is for a second special address 452 of a block of the WL/BB tracking table 310. In one implementation, the second special address 452 may be '0xFFFFFFF0'. An exemplary data structure 460 for storing the WL/BB tracking table in the reserved area of a flash memory is shown in FIG. 4F. Similarly, the MLC flash memory data programming rules dictate the data to be written to a new page for each update. The spare area stores the block indicator 467, the second special logical address 452 and tracking number 456.

Referring now to FIGS. 5A-5E, which collectively show a flowchart illustrating an exemplary process 500 of conducting data transfer requests of the flash memory of FIG. 2A in accordance with one embodiment of the present invention.

The process 500 is preferably understood in conjunction with previous figures and examples shown in FIGS. 6A-6D. The process 500 is performed by the microcontroller 302 with a flash memory controller program module 304 installed thereon.

The process 500 starts in an 'IDLE' state until the microcontroller 302 receives a data transfer request from a host (e.g., the host computing device 109 of FIG. 1C) at 502. Also received in the data transfer request is a logical sector address (LSA), which indicates the location the host wishes to either read or write a sector of data (i.e., 512-byte sector). Based on the parameters defined by the IMP and the physical characteristics of the MLC based flash memory, the received LSA is processed to extract the set, entry, page and sector numbers (see Table 1 for an example) included therein. After the received LSA has been processed, the process 500 moves to decision 504. It is determined whether the ACPUM 306 has been loaded with a set of PLTPPUI that covers the received LSA. If 'yes', the process 500 reads out the physical block number (PBK#) corresponding to the entry number of the received LSA at 516 before moving to another decision 518, in which it is determined whether the data transfer request is read or write (i.e., program).

If the decision 504 is 'no', the process 500 moves to decision 506. The process 500 checks whether the contents of the page buffer 430 need to be stored. In one implementation, the process 500 checks the sector update flags 432 that correspond to sectors in the page buffer 430. If any one of the flags 432 has been set to 'valid', then the contents of the page buffer 430 must be stored to the corresponding page of the corresponding physical block of the MLC flash memory at 550 (i.e., the decision 506 is 'yes'). Detailed process of step 550 is shown and described in FIG. 5D. After the contents of the page buffer 430 have been stored, the process 500 sets the ACPUM modification flag (ACPUMF) 412 to a 'modified' status at 508. In other words, the ACPUM 306 has been modified and needs to be stored in the flash memory in the future. Then the process 500 moves to yet another decision 510.

Otherwise if 'no' at decision 506, the process 500 moves the decision 510 directly. It is then determined if the ACPUM 306 has been modified. If 'yes', the process 500 moves to 580, in which, the process 500 writes the contents of the ACPUM 306 to one of a plurality of first special logical addresses (e.g., '0xFFFF0000' for PLTPPUI0, or '0xFFFF0001' for PLTP-PUI1, etc.) for storing corresponding set of PLTPPUI in the reserved area of the flash memory. The ACPUM modification flag 412 is reset at the end of 580. Detailed process of step 580 is shown and described in FIG. 5E. Then, at 514, the process 500 loads a corresponding set of PLTPPUI to the ACPUM 306 from the flash memory based on the set number extracted from the received LSA. Once the ACPUM 306 has been loaded, the process 500 reads the physical block number that corresponds to the entry number at 516 before moving to decision 518. If 'no' at decision 510, the process 500 skips step 580 and goes directly to 514.

Figure 5B:
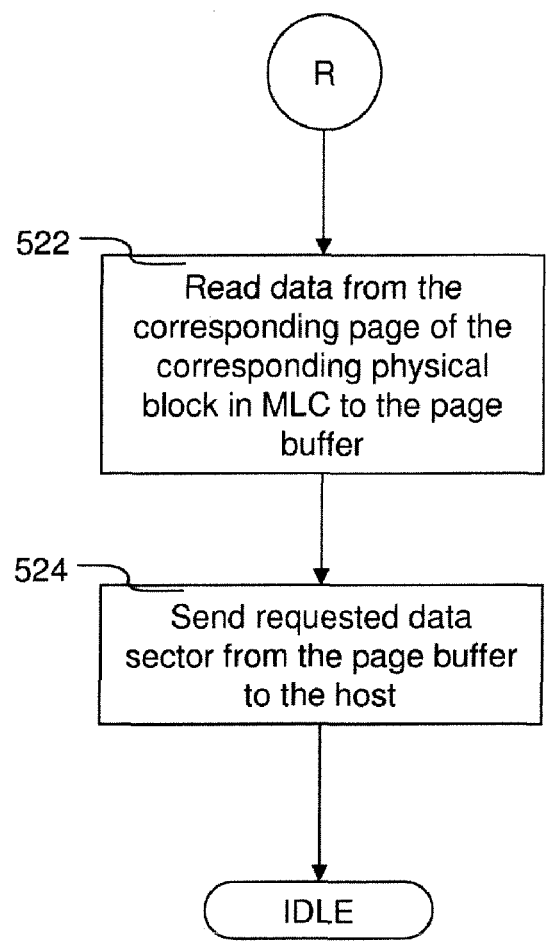

Next, at decision 518, if the data transfer request is a data read request, the process 500 continues with a sub-process 520 shown in FIG. 5B. The process 500 or sub-process 520 reads data from the corresponding page of the physical block in the flash memory to the page buffer 430. The corresponding page number is derived from the received LSA, and the physical block number is obtained through the ACPUM 306 for the entry numbers at 516. Finally, the process 500 sends the requested data sector from the page buffer 430 to the host 109 before going back the 'IDLE' status waiting for another data transfer request.

If the data transfer request is a data write or program request, the process 500 continues with a sub-process 530 shown in FIG. 5C. The process 500 or sub-process 530 moves to decision 532, in which it is determined whether the contents of the page buffer 430 have been modified. If 'no', the process 500 writes received data sector into the page buffer 430 according to the sector number derived from the received LSA, and marks the corresponding sector of the sector update flags 432 to indicate valid data in that particular sector has been written in the page buffer 430 at 538. The process 500 then moves back to the 'IDLE' state waiting for another data transfer request.

If 'yes' at decision 532, the process 500 moves to decision 534. It is determined if the received data sector is in the same entry and page numbers. If 'yes', the process 500 writes the received data sector to the page buffer 430 at 538 before going to the 'IDLE'. If 'no' at decision 534, the process 500 writes the page buffer contents to the corresponding page of the physical block of the flash memory at 550. Next, the process 500 sets the ACPUM modification flag 412 to a 'modified' status at 536. Next, at 538, the process 500 writes the received data sector to the page buffer before going back to the 'IDLE' state.

Finally, in additional to managing data read and write requests, the process 500 regularly performs a background physical block recycling process so that the blocks containing only stale data can be reused later. When the process 500 is in the 'IDLE' state, it performs test 540, in which it is determined if the idle time has exceeded a predefine time period. If 'yes', the process 500 performs the background recycling process, which may include issuing a dummy data write request to force the page buffer 430 and/or modified ACPUM 306 to be written to corresponding locations of the flash memory at 542. In one embodiment, the dummy data write/program command may be issued to rewrite some of seldom touched physical blocks, for example, physical blocks used for storing user application or system program modules.

Referring to FIG. 5D, a detailed process of step 550 is shown. First, the process 500 is at decision 552, in which it is determined if a new blank physical block is required for storing the contents of the page buffer 430 based on the MLC based flash memory data programming rules. The rules are as follows: 1) each page can only be programmed once (conventionally referred to as 'NOP=1'); and 2) data programming is performed to a page of a same block in the ascending or sequential order, or each new page must have a high page number in the same block. If 'no' at decision 552, the process 500 writes valid data sectors based on the sector update flags 432 from the page buffer 430 to the page register of the corresponding page of the corresponding physical block of the flash memory at 554. Next, at 556, the process 500 updates the corresponding one of the page usage flags in the ACPUM 306 for the page just written to the flash memory. The process 500 then resets the sector update flags at 558 before returning.

If 'yes' at decision 552, the process 500 searches for a blank physical block based on the wear leveling (WL) rule; once found, the process 500 designates it as a new block at 562. Then, the process 500 updates the ACPUM 306 with the new physical block number for the entry number and keeps the page usage flags the same. It is noted that the entry number is derived from the received LSA. Next, at 566, the process 500 copies all valid pages with page number less than the current page number from the old to the new physical block if needed. The current page number if the page number derived from the received LSA. Then, the process 500 writes the valid data sectors based on the sector update flags 432 from the page buffer 430 to the page register of the corresponding page of the new physical block at 568. Finally if necessary, the process 500 copies all valid pages with page number greater than the current page number from the old to the new physical block at 570. The process 500 resets the sector update flags at 558 before returning.

Figure 5E:
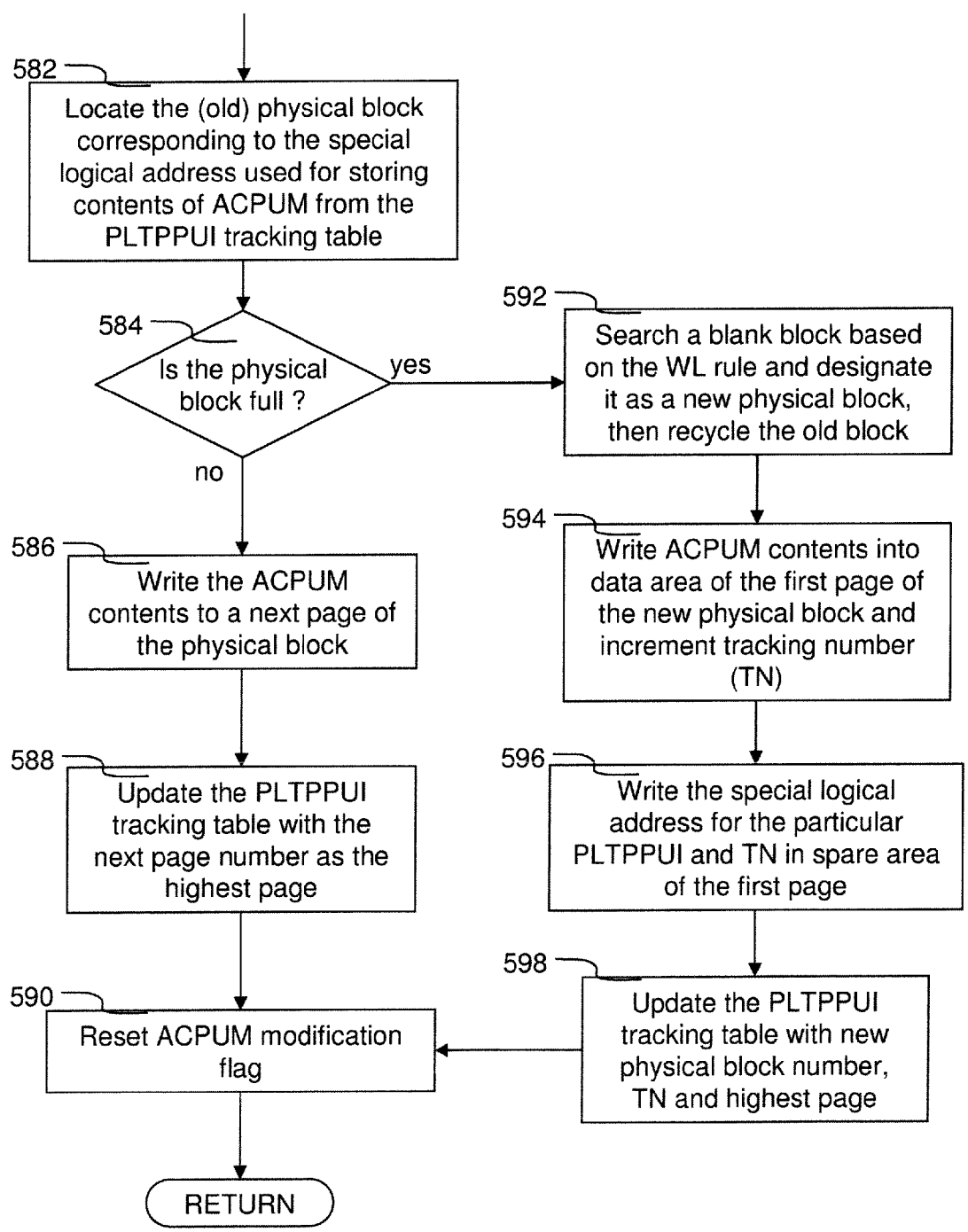

FIG. 5E is a flowchart illustrating step 580 of the process 500. First, in step 580, the process 500 locates the corresponding physical block in the reserved area of the flash memory using a particular one of the first special logical addresses from the PLTPPUI tracking table 308. The corresponding physical block is configured to store the contents of the current ACPUM 306, which is associated with the first special logical address, for example, '0xFFFF0000' for 'PLTPPUI0', '0xFFFF0001' for 'PLTPPUI1', etc. Next, at decision 584, it is determined whether the physical block is full or not. If 'no', the process 500 writes the contents of the ACPUM 306 to the next page in the physical block at 586. It is noted that the MLC based flash memory data programming rule dictates that only a new higher page in the same block is allowed to be programmed or written. Then the process 500 updates the PLTPPUI tracking table 308 to reflect that a new page has been written into the physical block by incrementing the highest page count 448 at 588. Finally, before returning at 590, the process 500 resets the ACPUM modification flag 412 to a 'not modified' status as the contents of the ACPUM 306 have been stored to the flash memory.

Referring back to decision 584, if 'yes', the process 500 searches a blank physical block as a new physical block (e.g., new physical block (PBK#1012) in FIG. 4C) in the reserved area of the flash memory based on the WL rule, and the old physical block (e.g. old physical block (PBK#1000) in FIG. 4C) is sent to a recycling queue for reuse at 592. Next, at 594, the process 500 writes the contents of the ACPUM 306 to the first page (e.g., 'P0' of FIG. 4C) of the new block. After the contents of the ACPUM have been stored in to the data area of the first page, the tracking number (TN) is incremented by one. Next, at 596, the first special logical address for this particular set of PTLPPUI and the new tracking number (TN) are written into the spare area of the first page. The process 500 then updates the PLTPPUI tracking table 308 with the new physical block number, the tracking number and the highest page number for the current set of PLTPPUI at 598. Before returning, the process 500 resets the ACPUM modification flag 412 to a 'not modified' status at 590.

FIGS. 6A-6D collectively show a sequence of data write or program requests to demonstrate the exemplary process 500 of FIGS. 5A-5E. In order to simplify the drawings and description, the sequence of the data write requests is perform on an exemplary flash memory with four sectors per page, four pages per block, and four entries per set. As a result of the simplified assumption, the logical sector address (LSA) 602 received along with the data write request can be processed in a scheme corresponding to Table 1. In other words, two least significant bits of the LSA represent the sector number, next two the page number, next two the entry number, and the remaining bits the set number.

The sequence of the data write requests starts with (a) writing to LSA=0, which corresponds to set 0 (i.e., PLTPPUI0), entry 0, page 0 and sector 0. PLTPPUI0 is loaded into ACUPUM 604, in which the first entry (i.e., entry 0) corresponds to physical block 'PBK#2' and page usage flags 606 are not set. The ACPUMF 614 is set to a 'un-modified' status. The sector data (S0) is written to the first sector of the page buffer 610 and the corresponding flag in the sector update flags 612 is set to a 'V' for valid data. The corresponding path in the process 500 for writing LSA=0 is as follows:
(1) receiving an LSA=0 and extracting set, entry, page and set numbers at 502;
(2) determining whether ACPUM contains a current set of PLTPPUI at 504 (yes, PLTPPUI0);
(3) reading physical block number (PBK#2) at entry 0 at 516;
(4) determining data transfer request type at 518 (write);
(5) determining whether page buffer contents have been modified at 532 (no);
(6) writing received data sector (S0) into the page buffer and marking corresponding sector (1st) update flag at 538; and
(7) going back to 'IDLE' for next data transfer request.

The next data write request (b) is to write to LSA=1. The corresponding path is the process 500 is as follows:
(1) receiving an LSA=1 and extracting set, entry, page and set numbers at 502;
(2) determining whether ACPUM contains a current set of PLTPPUI at 504 (yes, PLTPPUI0);
(3) reading physical block number (PBK#2) at entry 0 at 516;
(4) determining data transfer request type at 518 (write);
(5) determining whether page buffer contents have been modified at 532 (yes);
(6) determining whether page and block number current at 534 (yes);
(7) writing received data sector (S1) into page buffer and marking corresponding sector (2nd) update flag at 538; and
(8) going back to 'IDLE' for next data transfer request.

Figure 6A:
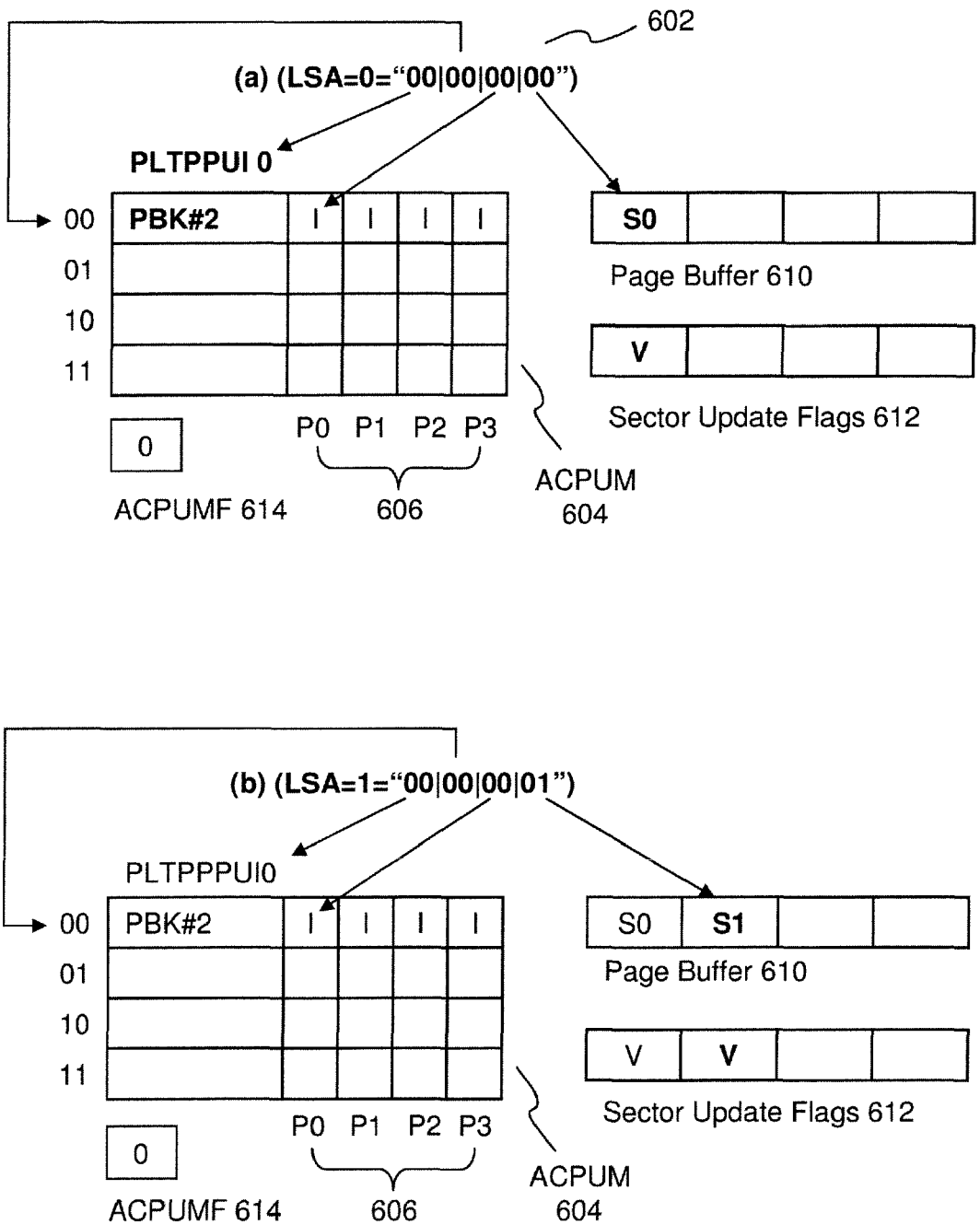
FIGS. 6(A)-6(E) collectively show a sequence of data write requests to demonstrate a process as shown in FIGS. 5(A)-5(E).
Figure 6B:
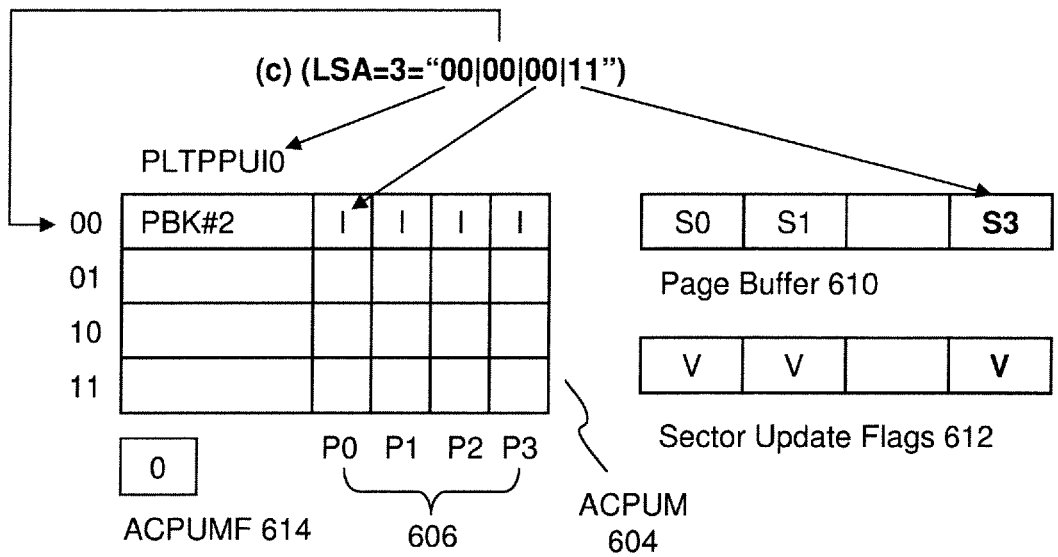
Figure 6B:
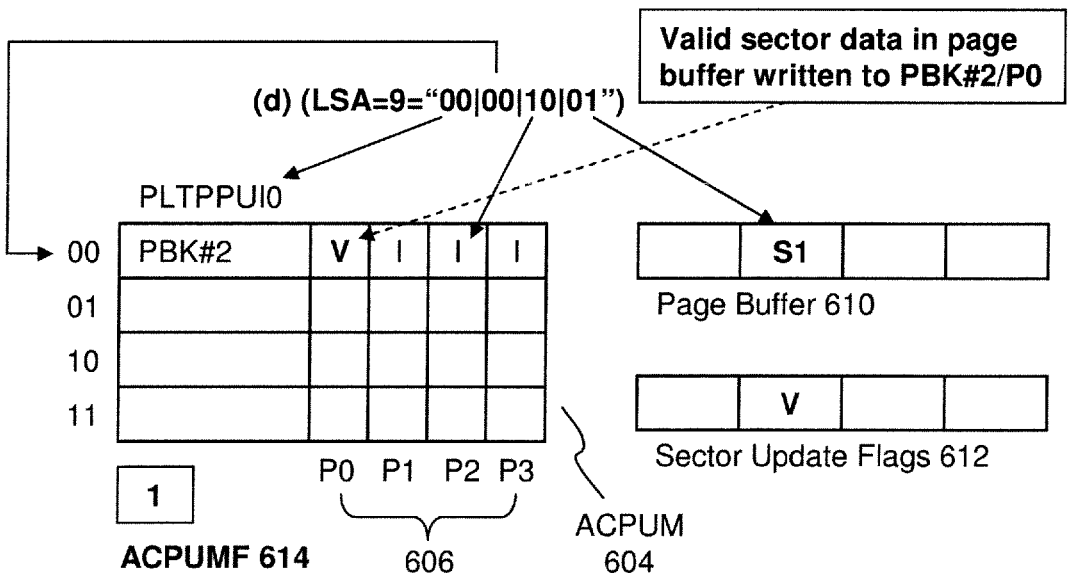

The next data write request (c) is to write to LSA=3 (FIG. 6B). The corresponding path is the process 500 is as follows:
(1) receiving an LSA=3 and extracting set, entry, page and set numbers at 502;
(2) determining whether ACPUM contains a current set of PLTPPUI at 504 (yes, PLTPPUI0);
(3) reading physical block number (PBK#2) at entry 0 at 516;
(4) determining data transfer request type at 518 (write);
(5) determining whether page buffer contents have been modified at 532 (yes);
(6) determining whether page and block number current at 534 (yes);
(7) writing received data sector (S3) into the page buffer and marking corresponding sector (4th) update flag at 538; and
(8) going back to 'IDLE' for next data transfer request.

The next data write request (d) is to write to LSA=9 (FIG. 6B). The corresponding path is the process 500 is as follows:
(1) receiving an LSA=9 and extracting set, entry, page and set numbers at 502;
(2) determining whether ACPUM contains a current set of PLTPPUI at 504 (yes, PLTPPUI0);
(3) reading physical block number (PBK#2) at entry 0 at 516;
(4) determining data transfer request type at 518 (write);
(5) determining whether page buffer contents have been modified at 532 (yes);
(6) determining whether page and block number current at 534 (no, same block but different page);
(7) writing the page buffer contents to the corresponding page (first page of PBK#2) at 550, which includes determining a new block is required at 552 (no); writing sector data to the first page of PBK#2 at 554; updating at the corresponding page usage flag (P0) in ACPUM at 556 and resetting sector update flags at 558;

(8) setting the ACPUMF (i.e., 1 for 'modified') at 536; and (9) writing received data sector (S1) into the page buffer and marking corresponding sector (2nd) update flag at 538 before going back to "IDLE".

Figure 6C:
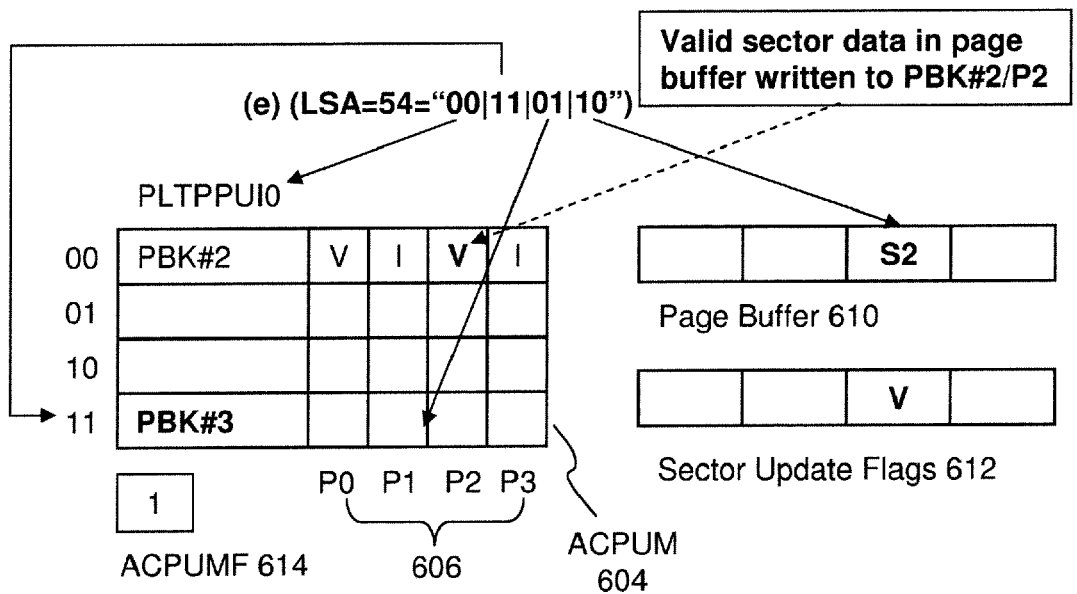

The next data write request (e) is to write to LSA=54 (FIG. 6C). The corresponding path is the process 500 is as follows:

(1) receiving an LSA=54 and extracting set, entry, page and set numbers at 502;

(2) determining whether ACPUM contains a current set of PLTPPUI at 504 (yes, PLTPPUI0);

(3) reading physical block number (PBK#3) at entry 3 (i.e., binary '11') at 516;

(4) determining data transfer request type at 518 (write);

(5) determining whether page buffer contents have been modified at 532 (yes);

(6) determining whether page and block number current at 534 (no, different block);

(7) writing the page buffer contents to the corresponding page (third page of PBK#2) at 550, which includes determining a new block is required at 552; writing sector data to the third page of PBK#2 at 554 (no); updating at the corresponding page usage flag (P2) in ACPUM at 556 and resetting sector update flags at 558;

(8) setting the ACPUMF (i.e., 1 for 'modified') at 536; and (9) writing received data sector (S2) into the page buffer and marking corresponding sector (3rd) update flag at 538 before going back to "IDLE".

Figure 6D:
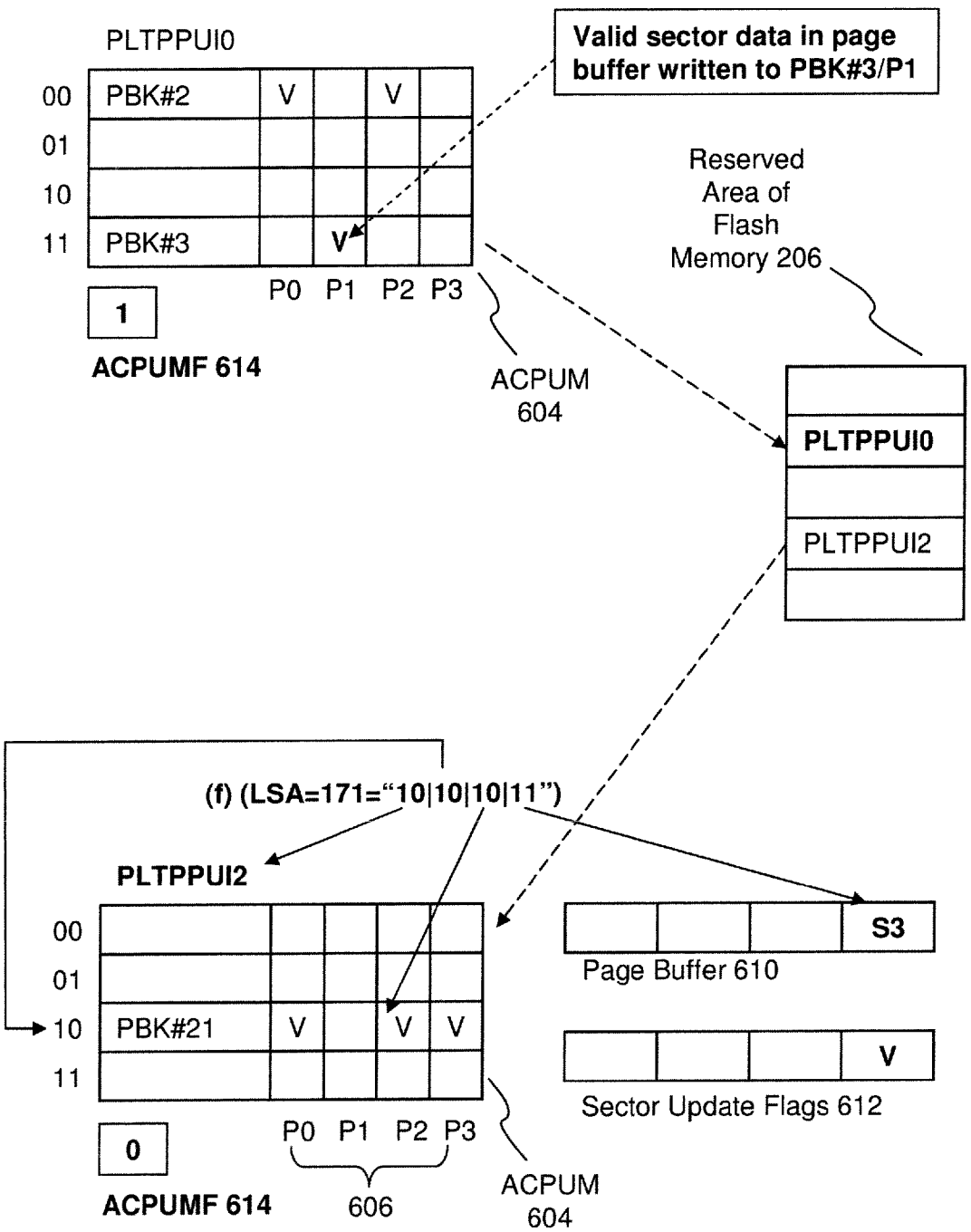

Finally, the next data write request (f) is to write to LSA=171 (FIG. 6D). The corresponding path is the process 500 is as follows:

(1) receiving an LSA=171 and extracting set, entry, page and set numbers at 502;

(2) determining whether ACPUM contains a current set of PLTPPUI at 504 (no, PLTPPUI0 does not match PLTPPUI2);

(3) determining whether the page buffer contents need to be stored at 506 (yes);

(4) writing the page buffer contents to the corresponding page (second page of PBK#3) at 550, which includes determining a new block is required at 552; updating sector data to the second page of PBK#3 at 554; updating at the corresponding page usage flag (P1) in ACPUM at 556 and resetting sector update flags at 558 and setting the ACPUMF (i.e., 1 for 'modified') at 508; (shown in upper half of FIG. 6D)

(5) determining whether ACPUM has bee modified at 510 (yes);

(6) writing the ACPUM contents to corresponding physical block corresponding to the first special logical address for particular one of the N sets of PLTPPUI (PLTPPUI0), which includes locating the physical block from the PLTPPUI tracking table at 582; determining if the physical block is full at 584 (no); writing the ACPUM contents to a next page in the physical block at 586; updating the PTLPPUI tracking table with the next page number as the highest page number at 588; and resetting the ACPUMF at 590 (i.e., 0 for 'un-modified');

(7) loading a corresponding set of PLTPPUI (PLTPPUI2) from MLC to ACPUM at 514;

(8) reading physical block number (PBK#21) at entry 2 (i.e., binary '10') at 516;

(9) determining data transfer request type at 518 (write);

(10) determining whether page buffer contents have been modified at 532 (no);

(11) writing received data sector into the page buffer ad marks the corresponding one of the sector update flags at 538 before going back to the 'IDLE' state;

(12) determining whether the 'IDLE' time has exceeded a predefined period at 540 (yes); and

Figure 6E:
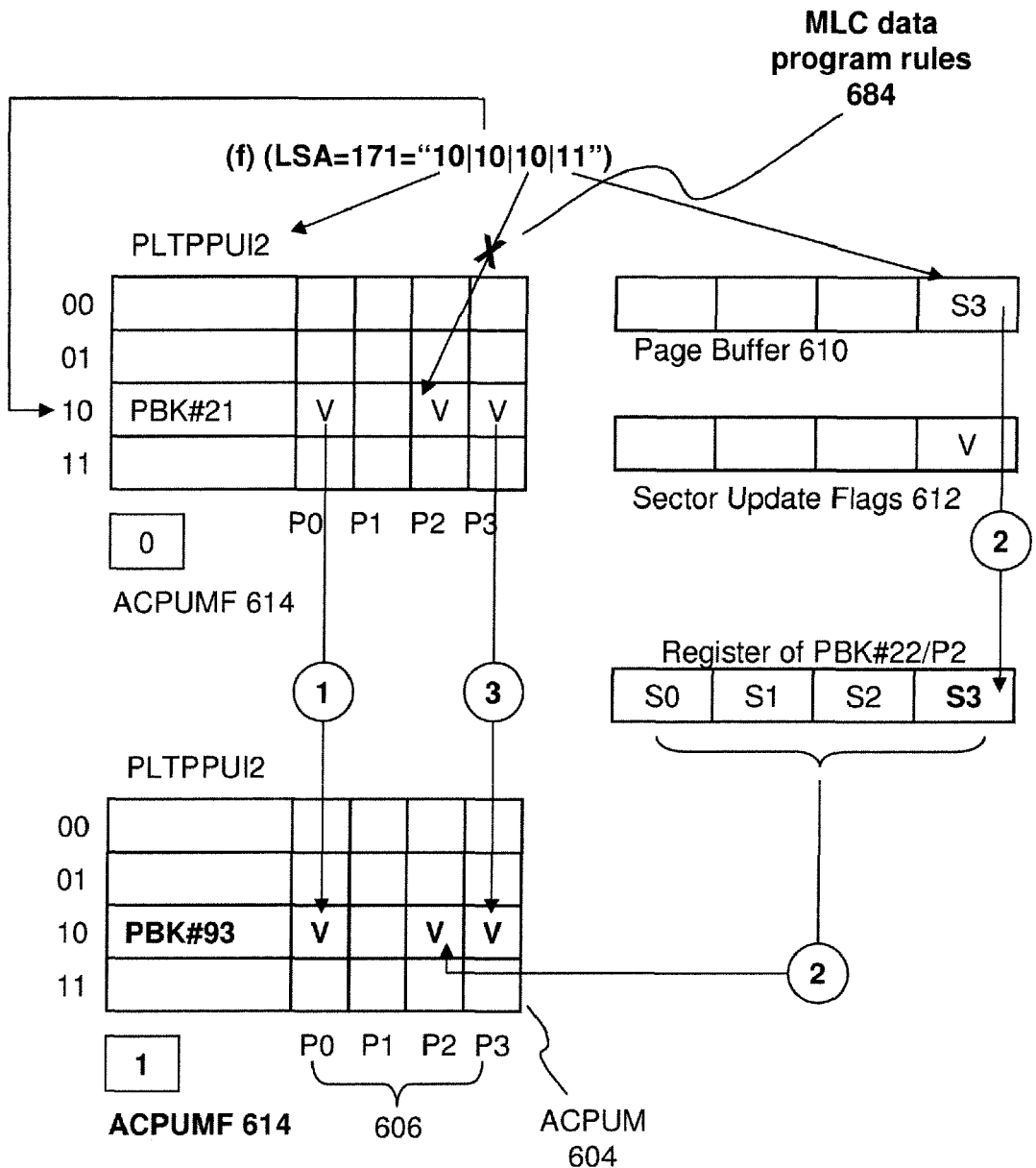

(13) performing background recycling of old blocks with stale data and writing the modified page buffer and ACPUM to MLC at 542 (more details in FIG. 6E).

FIG. 6E is a diagram showing a complicated data program or write involving a physical block containing data that prevents another data program operation directly in accordance with the MLC data programming rules. Using the sequence of data write requests shown in FIGS. 6A-6D, after the final data write request (f) has been completed. Both the page buffer 610 and ACPUM 604 have been modified, but yet to be stored in the flash memory. Due to data already existed in certain pages of the physical block (i.e. PBK#21), the MLC data program rules 684 prevent the modified page buffer 610 be written to PBK#21. A new blank block (i.e., PBK#93) is allocated and assigned to hold the data in the old block (PBK#21) including updates from the modified page buffer 610. The corresponding path in the step 550 of the process 500 is as follows:

(1) determining a new physical block is required according to the MLC rules at 552 (yes);

(2) allocating and assigning a new block based on the wear leveling rule at 554;

(3) updating the ACPUM 604 with the new block number (PBK#93) and same page usage flags at 564;

(4) if required, copying the valid pages with page number smaller than the current page number (i.e., P2 or 3rd page derived from LSA) from the old block (PBK#21) to the new block PBK#93 at 566 (see STEP 1 in circle in FIG. 6E);

(5) writing sector data (S3) from the page buffer to the register of the corresponding page of PBK#93 and thus updating the page in PBK#93 at 568 (see STEP 2 in circle in FIG. 6E);

(6) if required, copying the valid pages with page number greater than the current page number (i.e., P2 or 3rd page derived from LSA) from the old block (PBK#21) to the new block PBK#93 at 570 (see STEP 3 in circle in FIG. 6E); and (7) resetting the sector update flags at 558 before following the remaining data write steps of the process 500.

Referring now to FIGS. 7A-7E, which collectively are a flowchart illustrating an exemplary process 700 of initialization of a large capacity flash memory device in accordance with one embodiment of the present invention. The process 700 starts with a power up, for example, a flash memory device is plugged into a host 109. Next, the process 700 recreates the PLTPPUI tracking table 308 of FIG. 3 from stored N sets of PLTPPUI in the reserved area of the flash memory at 710. Then the process 700 validates the stored wear leveling and error correction code information with actual state of all of the physical blocks at steps 730 and 750, respectively. At 770, the process 700 verifies and validates the store PLTPPUI records against actual state of the physical blocks associated with a plurality of first special logical addresses. Finally, the process loads one of the N sets of PLTPPUI into ACPUM 306 at 790 before the initialization ends. The details of steps 710, 730, 750 and 770 are shown and described in respective FIGS. 7B, 7C, 7D and 7E.

Figure 7A:
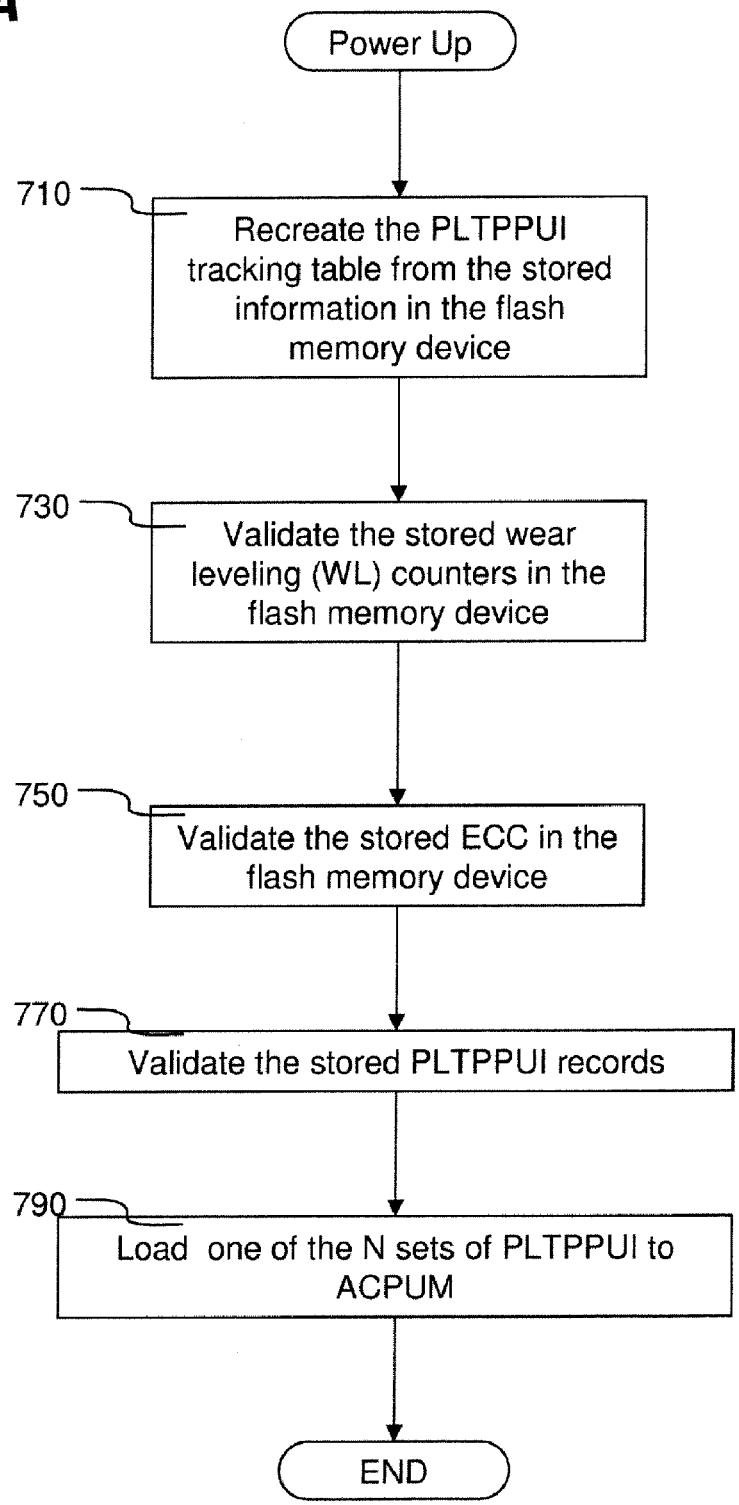
Figure 7B:
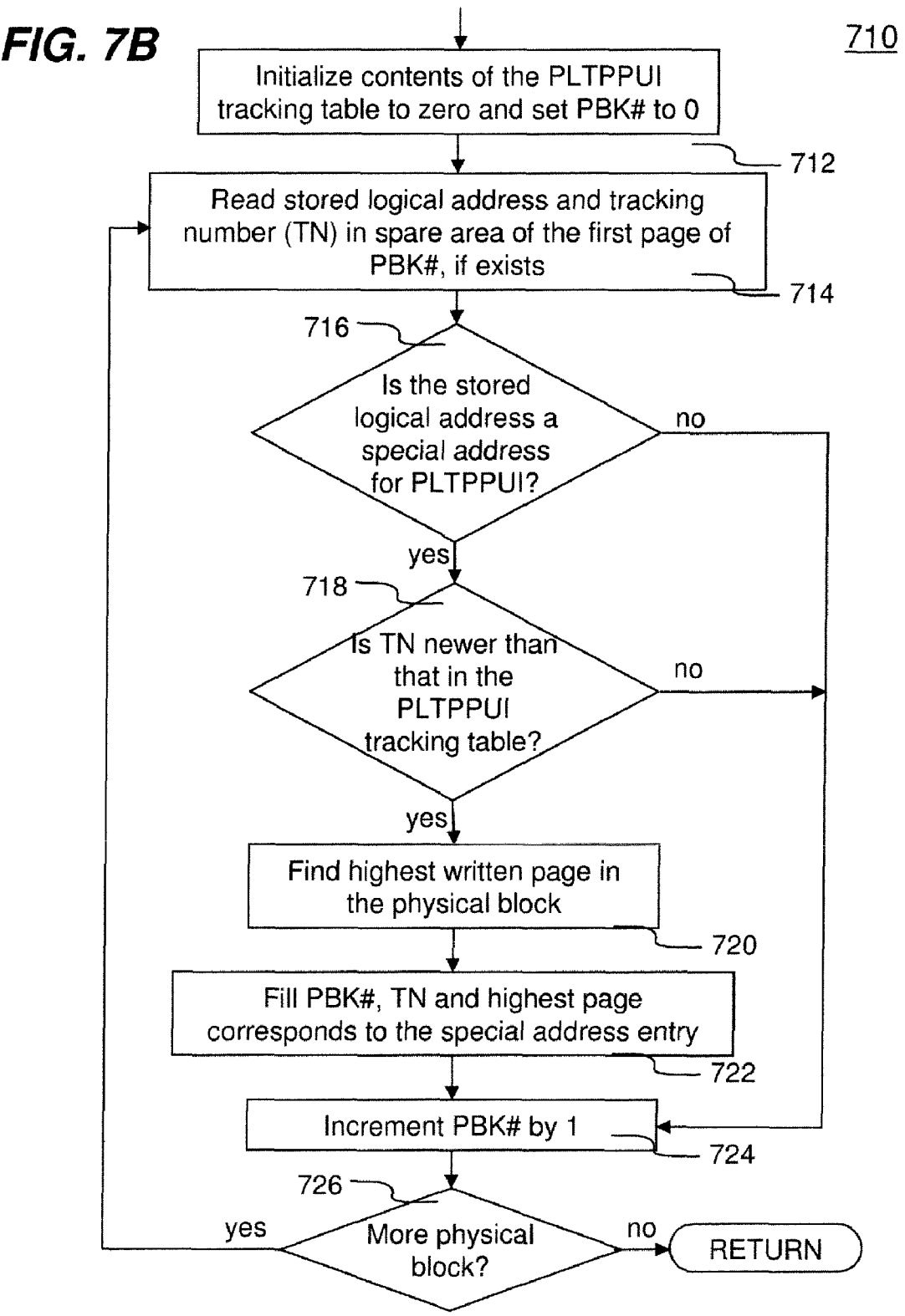

Shown in FIG. 7B, the process 700 initializes contents of the PLTPPUI tracking table 308 to zero and a physical block counter (PBK#) to 0 at 712. Next, the process 700 reads stored logical address and tracking number (TN) in the spare area of the first page of the physical block 'PBK#' at 714. Then the process 700 moves to decision 716, in which it is determined whether the stored logical address is one of the first special addresses for storing PLTPPUI issued by the FW and microcontroller. If 'no', the process 700 simply skips this physical block by incrementing the physical block counter 'PBK#' by one at 724. Next if additional physical block determined at decision 726, the process 700 moves back to step 714 for processing the next physical block, otherwise the step 710 is done.

If 'yes' at the decision 716, the process 700 follows the 'yes' branch to another decision 718. It is then determined whether the stored tracking number is newer than the one listed in the PLTPPUI tracking table 308. For example, the contents in the PLTPPUI tracking table is initialized to zero, any stored tracking number (TN) greater than zero indicates that the stored records are newer. If 'no' at decision 718, the process 700 skips this physical block similar to the 'no' branch of decision 716. However, if 'yes' at decision 718, the process 700 searches and locates a highest written page in this physical block 'PBK#' at 720. Next, at 722, the process 700 writes the 'PBK#', TN and highest page number in the PLTPPUI tracking table corresponding to the first special logical address. Finally, the process 700 increments the physical block count 'PBK#' by one at 724, then moves to decision 726 to determine either moving back to 714 for processing another physical block or ending the step 710.

Details of step 730 are shown in FIG. 7C. At 732, the process 700 initializes a physical block counter 'PBK#' and a group counter 'm' to zero. Next, the process 700 loads a 'mth' group of stored WL/BB tracking table into a scratch memory space (e.g., the page buffer 314 of FIG. 3) at 734. Then the process 700 reads the wear leveling (WL) counter and bad block indicator for the physical block 'PBK#' at 736. The process 700 moves to decision 738, in which it is determined whether the stored information is in conflict with the physical state of 'PBK#'. If 'yes', the process 700 corrects the conflict information to be consistent with the physical state in the scratch memory at 740. If 'no' at decision 738, there is no need to correct the conflict.

Next, at 742, the physical block counter 'PBK#' is incremented by one. The process 700 moves to another decision 744, it is determined if there is additional block in the 'mth' group. If 'yes', the process 700 goes back to step 736 reading another WL counters of another physical block to repeat the above steps until the decision 744 becomes 'no'. The process 700 updates the stored WL/BB tracking table 310 at 746. At next decision 748, it is determined if there is any more physical block. If 'yes', the process 700 increments the group counter at 749 then goes back to 734 for repeating the above steps for another group. Otherwise, the step 730 returns when the decision 748 is 'no'.

Figure 7D:
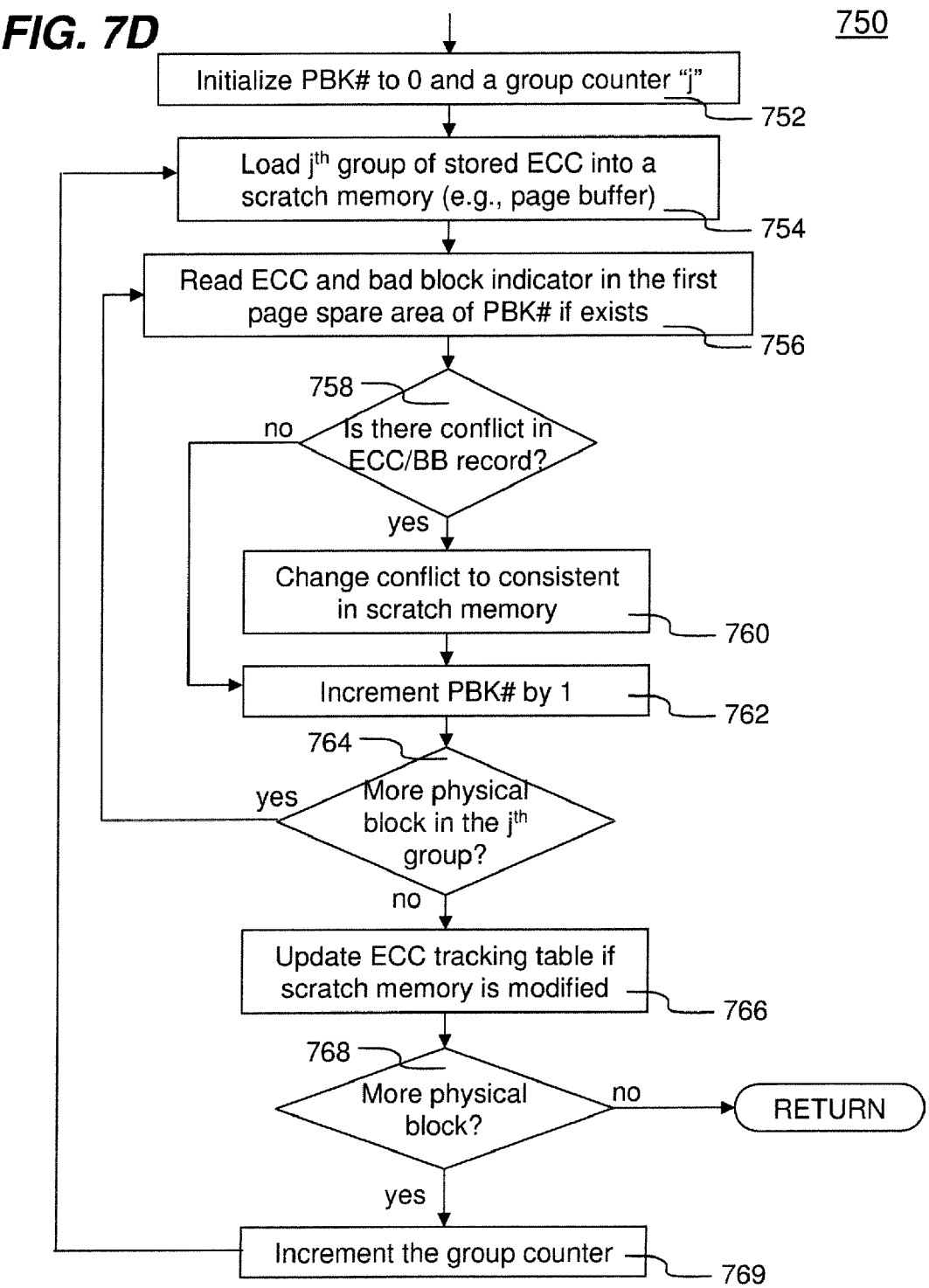

FIG. 7D shows details of step 750, which is substantially similar to the step 730. Instead of checking and correcting conflict WL/BB information, the step 750 validates and corrects the stored error correction code (ECC) for all physical blocks. The number of group is related to the size of the scratch memory. For example, a 2048-byte page buffer can provide space for holding a group of 1024 WL counters, if each of the WL counters is a 16-bit number. As to the 8-bit ECC, the same 2048-byte page buffer may hold a group of 2048 ECC codes.

Figure 7E:
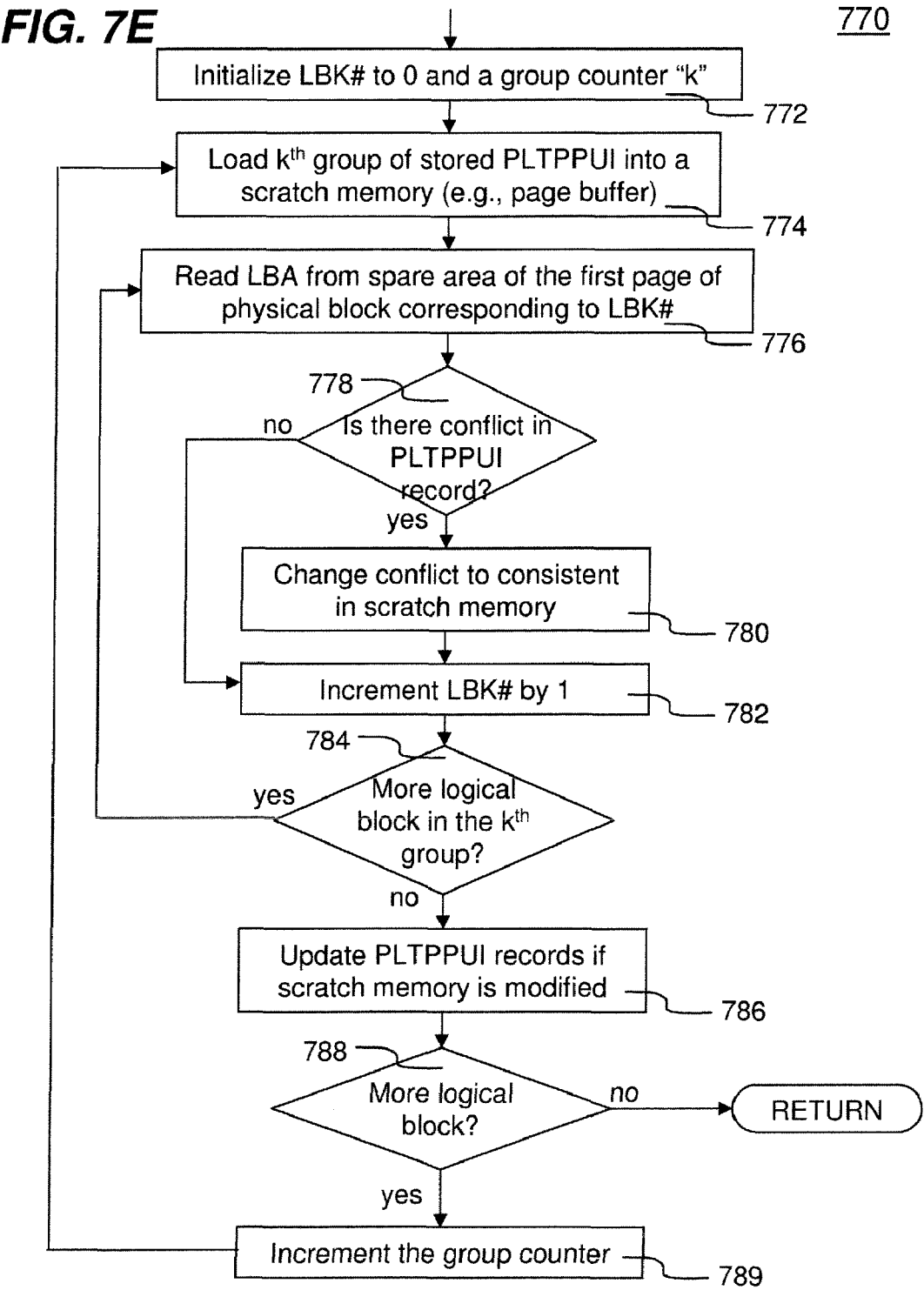

FIG. 7E shows details of step 770. At 772, the process 700 initializes a logical block counter 'LBK#' and a group counter 'k' to zero. The process 700 loads a 'kth' group of stored PLTPPUI into a scratch memory space (e.g., a page buffer or other available memory) at 774. The process 700 reads logical block address from the spare area of the first page of a physical block corresponding to the 'LBK#' at 776. Next, at decision 778, it is determined whether there is conflict between the stored PLTPPUI and the physical page usage of the physical block. If 'yes', the conflict is corrected with the physical state in the scratch memory at 780. Otherwise, the process 700 skips step 780. Next, at 782, the process 700 increments the logical block counter 'LBK#' by one. The process 700 then moves to another decision 784, in which it is determined if there is more block in the 'kth' group. If 'yes', the process 700 moves back the step 776 repeating the process until the decision 784 becomes 'no'. Then the process 700 updates the stored PLTPPUI records if the scratch memory has been altered at 786. Next, at decision 788, if there is more logical block, the process 700 follows the 'yes' branch to step 789 by incrementing the group counter and repeating the process from step 774 until the decision 788 becomes 'no', in which the step 770 ends.

Each entry record of PLTPPUI is 18-byte, which is a sum of 2-byte physical block number plus 128-bit (i.e., 16-byte) of page usage flags (i.e., 128 pages per block). Using 2048-byte page buffer as a scratch memory can only hold a group of 113 entry records. One may use a larger memory such as ACPUM 306 as the scratch memory, which may hold more entry records thereby reducing the initialization time.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An electronic data storage device adapted to be accessed by a host computer motherboard, the electronic data storage device comprising:
    a non-volatile memory device for storing one or more data files, verification utility programs and fingerprint/password reference data obtained by scanning a fingerprint of a person authorized to access the data files, wherein the data files and fingerprint reference data are stored and located in different sectors of the non-volatile memory device;
    a fingerprint sensor adapted to scan a fingerprint of a user of the electronic data storage device and to generate fingerprint scan data associated with the user, wherein the fingerprint sensor includes a two-dimensional array of scan cells that defines a fingerprint scanning area, wherein each of the scan cells generates a first logic signal upon detection of a ridge in the fingerprint of the user or a second logic signal upon detection of a valley in the fingerprint of the user;
    an input/output interface circuit to establish a universal serial bus (USB) communication link with the host computer motherboard; and
    a processing unit coupled to the non-volatile memory device, the fingerprint sensor, and the input/output interface circuit, wherein the processing unit is configured to receive the fingerprint scan data of the user from the fingerprint sensor, to compare the fingerprint scan data with the fingerprint reference data associated with the user stored in the non-volatile memory device to verify whether the user identified by the fingerprint scan data is authorized to access the data files stored in the secure area of non-volatile memory device, and to activate the input/output interface circuit to enable the host computer motherboard to access the data files stored in the non-volatile memory device upon verifying that the user of the electronic data storage device is authorized to access,
    wherein in response to a user inserting the electronic data storage device into a host computer motherboard, the processing unit is configured to launch a verification utility program from a read-only memory (ROM) of the non-volatile memory of the electronic data storage device, wherein the verification utility program is configured to perform at least one of password verification and fingerprint verification operations to verify whether the user is authorized to access the data files stored in the secure area of non-volatile memory device of the electronic data storage device.

2. The electronic data storage device of claim 1, wherein the verification utility program, when executed by the processing unit, is configured to
    determine whether a password verification option has been enabled,
    if the password verification option is enabled, to prompt the user to enter a first password, and
    to compare the entered first password against a second password associated with the user and previously stored in a database of the electronic data storage device as a part of password reference data, wherein the user is authorized to access the data files only if the first password matches the second password.

3. The electronic data storage device of claim 1, wherein the verification utility program, when executed by the processing unit, is configured further to
    prior to prompting the user to enter the first password, determine whether the second password has been previously stored in the database as part of the password reference data,
    if there is no valid password reference data stored in the database, prompt with confirmation the user to enter the second password and a hint to help user to recover the second password if subsequently the user forgets the second password, and
    store the second password and the hint entered by the user in the database.

4. The electronic data storage device of claim 1, wherein a predetermined number of attempts are provided for the user to enter the first password, if a previous entered first password does not matches with the second password stored in the database, and wherein after the predetermined number of attempts have been tried, the verification utility program terminates without allowing the user to access the data files stored within the secure area of electronic data storage device.

5. The electronic data storage device of claim 1, wherein the verification utility program, when executed by the processing unit, is configured further to
    determine whether a fingerprint verification option has been enabled,
    if the fingerprint verification option is enabled, to prompt the user to swipe a finger across a scanning surface of the fingerprint sensor to obtain a first fingerprint scan data of the user, and
    to compare the first fingerprint scan data against a second fingerprint scan data associated with the user and previously stored in a database of the electronic data storage device as a part of fingerprint reference data, wherein the user is authorized to access the data files in secure area only if the first fingerprint scan data matches the second fingerprint scan data.

6. The electronic data storage device of claim 1, wherein the verification utility program, when executed by the processing unit, is configured further to
    prior to prompting the user to obtain the first fingerprint scan data, determine whether the second fingerprint scan data has been previously stored in the database as part of the fingerprint reference data, if there is no valid fingerprint reference data stored in the database, prompt the user to swipe the finger on the scanning surface of the fingerprint sensor to obtain the second fingerprint scan data, and store the second fingerprint scan data as part of fingerprint reference data in the database.

7. The electronic data storage device of claim 1, wherein a predetermined number of attempts are provided for the user to scan the first fingerprint scan data, if a previous scanned first fingerprint scan data does not matches with the second fingerprint scan data stored in the database, and wherein after the predetermined number of attempts have been tried, the verification utility program terminates without allowing the user to access the data files stored within the electronic data storage device.

8. The electronic data storage device of claim 1, wherein the second fingerprint scan data is previously obtained from a particular finger of the user and stored in the database, wherein the verification utility program is configured to prompt the user to swipe the particular finger on the scanning surface of the fingerprint sensor.

9. The electronic data storage device of claim 1, wherein the non-volatile memory device is a multi-level cell (MLC) flash memory device.

10. A method of providing security to an electronic data storage device, the method comprising:

storing one or more data files, verification utility programs and fingerprint/password reference data obtained by scanning a fingerprint of a person authorized to access the data file in a non-volatile memory device of the electronic data storage device; and in response to inserting the electronic data storage device into a host computer motherboard, launching a verification utility program from a read-only memory (ROM) of the non-volatile memory of the electronic data storage device to verify whether a user associated with the electronic data storage device is authorized to access content stored in the electronic data storage device, including scanning via a fingerprint sensor of the electronic data storage device a fingerprint of a user of the electronic data storage device to generate a first fingerprint scan data, wherein the fingerprint sensor includes a two-dimensional array of scan cells that defines a fingerprint scan area, wherein each of the scan cells generates a first logic signal upon detection of a ridge in the fingerprint of the user and a second logic signal upon detection of a valley in the fingerprint of the user, and comparing the first fingerprint scan data with a second fingerprint scan data as part of the fingerprint reference data stored in a database of a non-volatile memory device of the electronic data storage device to verify whether the user is authorized to access the data files stored in the electronic data storage device.

11. The method of claim 10, further comprising:

determining whether a fingerprint verification option has been enabled;

if the fingerprint verification option is enabled, prompting the user to swipe a finger across a scanning surface of the fingerprint sensor to obtain a first fingerprint scan data of the user; and comparing the first fingerprint scan data against a second fingerprint scan data associated with the user and previously stored in a database of the electronic data storage device as part of fingerprint reference data, wherein the user is authorized to access the data files in secure area only if the first fingerprint scan data matches the second fingerprint scan data.

12. The method of claim 10, further comprising:

prior to prompting the user to obtain the first fingerprint scan data, determining whether the second fingerprint scan data has been previously stored in the database as part of the fingerprint reference data;

if there is no valid fingerprint reference data stored in the database, prompting the user to swipe the finger on the scanning surface of the fingerprint sensor to obtain the second fingerprint scan data; and storing the second fingerprint scan data as part of the fingerprint reference data in the database.

13. The method of claim 10, further comprising:

providing a predetermined number of attempts for the user to scan the first fingerprint scan data, if a previous scanned first fingerprint scan data does not matches with the second fingerprint scan data stored in the database; and after the predetermined number of attempts have been tried, terminating the verification utility program without allowing the user to access the data files stored within the electronic data storage device.

14. The method of claim 10, wherein the second fingerprint scan data is previously obtained from a particular finger of the user and stored in the database, wherein the verification utility program is configured to prompt the user to swipe the particular finger on the scanning surface of the fingerprint sensor.

15. The method of claim 10, wherein the verification utility program is configured to perform password verification operations, including determining whether a password verification option has been enabled, if the password verification option is enabled, prompting the user to enter a first password, and comparing the entered first password against a second password associated with the user and previously stored in a database of the electronic data storage device as a part of password reference data, wherein the user is authorized to access the data files only if the first password matches the second password.

16. The method of claim 10, further comprising:

prior to prompting the user to enter the first password, determining whether the second password has been previously stored in the database as part of the password reference data;

if there is no valid password reference data stored in the database, prompting with confirmation the user to enter the second password and a hint to recover the second password if subsequently the user forgets the second password; and storing the second password and the hint entered by the user in the database.

17. The method of claim 10, further comprising:

providing a predetermined number of attempts for the user to enter the first password if a previous entered first password does not matches with the second password stored in the database; and after the predetermined number of attempts have been tried, terminating the verification utility program without allowing the user to access the data files stored within the electronic data storage device.

18. The method of claim 10, wherein the non-volatile memory device is a multi-level cell (MLC) flash memory device.

19. A non-transitory machine-readable storage medium having instructions stored therein, which when executed by a processor, cause the process to perform a method of providing security to an electronic data storage device, the method comprising:
- storing one or more data files, verification utility programs and fingerprint reference data obtained by scanning a fingerprint of a person authorized to access the data file in the secure area of a non-volatile memory device of the electronic data storage device; and
- in response to inserting the electronic data storage device into a host computer motherboard, launching a verification utility program from a read-only memory (ROM) of the non-volatile memory of the electronic data storage device to verify whether a user associated with the electronic data storage device is authorized to access content stored in the electronic data storage device, including
  - scanning via a fingerprint sensor of the electronic data storage device a fingerprint of a user of the electronic data storage device to generate a first fingerprint scan data, wherein the fingerprint sensor includes a two-dimensional array of scan cells that defines a fingerprint scan area, wherein each of the scan cells generates a first logic signal upon detection of a ridge in the fingerprint of the user and a second logic signal upon detection of a valley in the fingerprint of the user, and
  - comparing the first fingerprint scan data with a second fingerprint scan data as part of the fingerprint reference data stored in a database of a non-volatile memory device of the electronic data storage device to verify whether the user is authorized to access the data files stored in the secure area of non-volatile memory of electronic data storage device.

20. The non-transitory machine-readable storage medium of claim 19, wherein the method further comprises:
- determining whether a fingerprint verification option has been enabled;
- if the fingerprint verification option is enabled, prompting the user to swipe a finger across a scanning surface of the fingerprint sensor to obtain a first fingerprint scan data of the user; and
- comparing the first fingerprint scan data against a second fingerprint scan data associated with the user and previously stored in a database of the non-volatile memory of electronic data storage device as a part of fingerprint reference data, wherein the user is authorized to access the data files only if the first fingerprint scan data matches the second fingerprint scan data.

21. The non-transitory machine-readable storage medium of claim 19, wherein the method further comprises:
- prior to prompting the user to obtain the first fingerprint scan data, determining whether the second fingerprint scan data has been previously stored in the database as part of the fingerprint reference data;
- if there is no valid fingerprint reference data stored in the database, prompting the user to swipe the finger on the scanning surface of the fingerprint sensor to obtain the second fingerprint scan data; and
- storing the second fingerprint scan data as part of the fingerprint reference data in the database.

22. The non-transitory machine-readable storage medium of claim 19, wherein the non-volatile memory device is a multi-level cell (MLC) flash memory device.

23. A non-transitory machine-readable storage medium having instructions stored therein, which when executed by a processor, cause the process to perform a method of providing security to an electronic data storage device, the method comprising:
- storing one or more data files, verification utility programs and password reference data obtained by password entry by a person authorized to access the data file in the secure area of a non-volatile memory device of the electronic data storage device; and
- in response to inserting the electronic data storage device into a host computer motherboard, launching a verification utility program from a read-only memory (ROM) of the non-volatile memory of the electronic data storage device to verify whether a user associated with the electronic data storage device is authorized to access content stored in the electronic data storage device, including
  - receiving a first password from a user, and comparing the first password with a second password as part of the password reference data stored in a database of a non-volatile memory device of the electronic data storage device to verify whether the user is authorized to access the data files stored in the secure area of non-volatile memory of electronic data storage device.

24. The non-transitory machine-readable storage medium of claim 23, wherein the method further comprises:
- determining whether a password verification option has been enabled;
- if the password verification option is enabled, prompting the user to enter first password of the user; and
- comparing the first password against a second password associated with the user and previously stored in a database of the non-volatile memory of electronic data storage device as a part of password reference data, wherein the user is authorized to access the data files only if the first password matches the second password.

25. The non-transitory machine-readable storage medium of claim 23, wherein the method further comprises:
- prior to prompting the user to obtain the first password, determining whether the second password has been previously stored in the database as part of the password reference data;
- if there is no valid password reference data stored in the database, prompting the user to enter password and hint to obtain the second password; and
- storing the second password as part of the password reference data in the database.

26. The non-transitory machine-readable storage medium of claim 23, wherein the non-volatile memory device is a multi-level cell (MLC) flash memory device.

* * * * *